(12) United States Patent
Elliston et al.

(10) Patent No.: US 8,210,081 B2
(45) Date of Patent: Jul. 3, 2012

(54) RECIPROCATING SAW BLADE HAVING VARIABLE-HEIGHT TEETH AND RELATED METHOD

(75) Inventors: Asif Elliston, Springfield, MA (US);
William B. Korb, Melrose, CT (US);
Stephen A. Hampton, East Longmeadow, MA (US)

(73) Assignee: Irwin Industrial Tool Company, Huntersville, NC (US)

( * ) Notice: Subject to any disclaimer, the term of this patent is extended or adjusted under 35 U.S.C. 154(b) by 123 days.

(21) Appl. No.: 11/963,474

(22) Filed: Dec. 21, 2007

(65) Prior Publication Data

US 2008/0307936 A1 Dec. 18, 2008

Related U.S. Application Data

(60) Provisional application No. 60/934,262, filed on Jun. 12, 2007.

(51) Int. Cl.
*B27B 33/14* (2006.01)

(52) U.S. Cl. ............................................. 83/835; 83/846

(58) Field of Classification Search .................... 83/835, 83/852–855, 836–851
See application file for complete search history.

(56) References Cited

U.S. PATENT DOCUMENTS

| | | | |
|---|---|---|---|
| 603,128 A | 4/1898 | Clemson | |
| 820,969 A | 5/1906 | Grelok | |
| 853,255 A * | 5/1907 | Miller | 83/848 |
| 1,181,529 A | 5/1916 | Hutton | |
| 1,381,930 A | 6/1921 | Morgan | |
| 2,126,382 A | 8/1938 | Goff | |
| 2,227,864 A | 1/1941 | Ronan | |
| 2,394,035 A | 2/1946 | Blum | |
| 2,534,424 A | 12/1950 | Dryden | |
| 2,568,870 A | 9/1951 | Ronan | |
| 2,635,327 A | 4/1953 | Enlow | |
| 2,637,355 A | 5/1953 | Chapin | |
| 2,682,098 A | 6/1954 | Wilcox | |
| 3,171,457 A | 3/1965 | Brown | |

(Continued)

FOREIGN PATENT DOCUMENTS

DE 19501019 1/1995

(Continued)

OTHER PUBLICATIONS

International Search Report, Int'l App. No. PCT/US2008/066587, mailed Sep. 8, 2008.

(Continued)

*Primary Examiner* — Boyer D Ashley
*Assistant Examiner* — Omar Flores Sanchez
(74) *Attorney, Agent, or Firm* — McCarter & English, LLP

(57) ABSTRACT

A reciprocating saw blade, for use in a portable power reciprocating saw including a chuck for releasably engaging the saw blade, includes a tang having an elongated axis and being engageable with the chuck for attaching the saw blade to the reciprocating saw. The saw further includes a blade portion having a cutting edge that defines a plurality of cutting teeth. The cutting teeth define a repeating pattern of successive groups of teeth. Each group of teeth is less than about a half inch in length, and includes a plurality of laterally offset teeth, at least one relatively high first tooth and at least one relatively low second tooth. Prior to tooth set, the at least one relatively high first tooth is at least about 0.002 inch higher than the at least one relatively low second tooth.

36 Claims, 13 Drawing Sheets

U.S. PATENT DOCUMENTS

| | | | |
|---|---|---|---|
| 3,292,674 A | 12/1966 | Turner | |
| 3,309,756 A | 3/1967 | Segal | |
| 3,576,061 A | 4/1971 | Pahlitzsch | |
| 3,576,200 A | 4/1971 | Elmes | |
| 4,179,967 A | 12/1979 | Clark | |
| 4,232,578 A * | 11/1980 | Stellinger et al. | 83/661 |
| 4,272,788 A | 6/1981 | Ogita | |
| 4,292,871 A | 10/1981 | Neumeyer | |
| RE31,433 E | 11/1983 | Clark | |
| 4,557,172 A | 12/1985 | Yoneda | |
| 4,784,033 A | 11/1988 | Hayden | |
| 4,784,034 A | 11/1988 | Stones | |
| 4,798,001 A | 1/1989 | Grossman | |
| 4,802,396 A | 2/1989 | Kuklinski | |
| 4,813,324 A | 3/1989 | Yoshida et al. | |
| 4,827,822 A | 5/1989 | Yoshida | |
| 4,913,022 A | 4/1990 | Kuklinski | |
| 4,958,546 A | 9/1990 | Yoshida | |
| 5,018,421 A | 5/1991 | Lucki | |
| 5,094,135 A | 3/1992 | Nakahara | |
| 5,331,876 A | 7/1994 | Hayden, Sr. | |
| 5,340,129 A | 8/1994 | Wright | |
| 5,410,935 A | 5/1995 | Holston et al. | |
| 5,425,296 A | 6/1995 | Kullmann | |
| 5,433,457 A | 7/1995 | Wright | |
| 5,477,763 A | 12/1995 | Kullmann | |
| 5,501,129 A | 3/1996 | Armstrong | |
| 5,603,252 A | 2/1997 | Hayden, Sr. | |
| 5,606,900 A | 3/1997 | Stoddard | |
| 5,697,280 A | 12/1997 | Armstrong et al. | |
| 5,832,803 A | 11/1998 | Hayden, Sr. | |
| 5,848,473 A | 12/1998 | Brandenburg | |
| 5,868,058 A | 2/1999 | Senegas | |
| 6,003,422 A | 12/1999 | Holston | |
| 6,119,571 A | 9/2000 | Hayden, Sr. | |
| 6,145,426 A | 11/2000 | Ward | |
| 6,158,324 A | 12/2000 | Kullmann et al. | |
| 6,167,792 B1 * | 1/2001 | Korb et al. | 83/835 |
| 6,178,646 B1 | 1/2001 | Schnell | |
| 6,220,139 B1 | 4/2001 | Kobayashi | |
| 6,220,140 B1 | 4/2001 | Hellebergh | |
| 6,230,411 B1 | 5/2001 | Wall | |
| 6,244,152 B1 | 6/2001 | Di Nicolantonio | |
| 6,257,226 B1 | 7/2001 | Hayden | |
| 6,269,722 B1 | 8/2001 | Hellbergh | |
| 6,276,249 B1 | 8/2001 | Handshuh | |
| 6,357,124 B1 | 3/2002 | Wall | |
| 6,363,827 B1 | 4/2002 | Osing | |
| 6,439,094 B1 | 8/2002 | Yoneda et al. | |
| 6,520,722 B2 | 2/2003 | Hopper | |
| 6,532,852 B1 | 3/2003 | Tsujimoto | |
| 6,598,509 B2 | 7/2003 | Cook | |
| 6,834,573 B1 | 12/2004 | Nakahara | |
| 7,036,415 B2 | 5/2006 | Tsujimoto | |
| 7,036,417 B2 | 5/2006 | Alton | |
| 7,225,714 B2 * | 6/2007 | Rompel et al. | 83/835 |
| 2001/0004860 A1 | 6/2001 | Kullmann | |
| 2001/0015120 A1 | 8/2001 | Hickey | |
| 2002/0050196 A1 | 5/2002 | Fluhrer | |
| 2003/0010179 A1 | 1/2003 | McLuen | |
| 2003/0051593 A1 | 3/2003 | Kocher et al. | |
| 2004/0035282 A1 | 2/2004 | Tsujimoto | |
| 2004/0050234 A1 | 3/2004 | Fluhrer | |
| 2004/0182218 A1 | 9/2004 | Chao | |
| 2004/0255749 A1 | 12/2004 | Hayden, Sr. | |
| 2005/0211046 A1 | 9/2005 | Thomas et al. | |
| 2005/0235799 A1 | 10/2005 | Hampton et al. | |
| 2005/0257660 A1 | 11/2005 | Hayden | |
| 2006/0065098 A1 | 3/2006 | Cranna | |
| 2006/0130628 A1 | 6/2006 | Rompel et al. | |
| 2006/0130629 A1 | 6/2006 | Rompel | |
| 2006/0162526 A1 | 7/2006 | Nagano et al. | |
| 2007/0193427 A1 | 8/2007 | Hayden, Sr. | |

FOREIGN PATENT DOCUMENTS

| | | |
|---|---|---|
| DE | 195 01 019 A1 | 7/1996 |
| DE | 10300392 | 7/2004 |
| DE | 10 2005 056177 A1 | 6/2006 |
| EP | 1 325 791 A2 | 7/2003 |
| JP | 8-118305 A | 5/1996 |
| JP | 10-202426 A | 8/1998 |
| JP | 2000271817 | 10/2000 |
| JP | 2001-179536 A | 7/2001 |
| JP | 2002-036027 A | 2/2002 |
| JP | 2002-370123 A | 12/2002 |

OTHER PUBLICATIONS

Written Opinion of International Searching Authority, Int'l App. No. PCT/US2008/066587, mailed Sep. 8, 2008.

Supplementary European Search Report for European Application No. EP 08 77 0733.

* cited by examiner

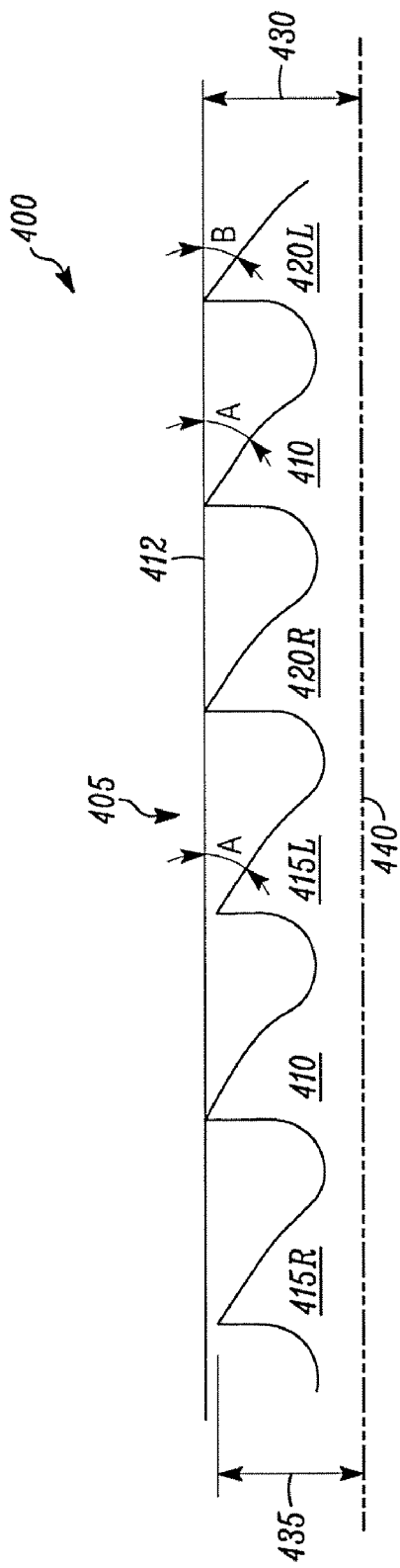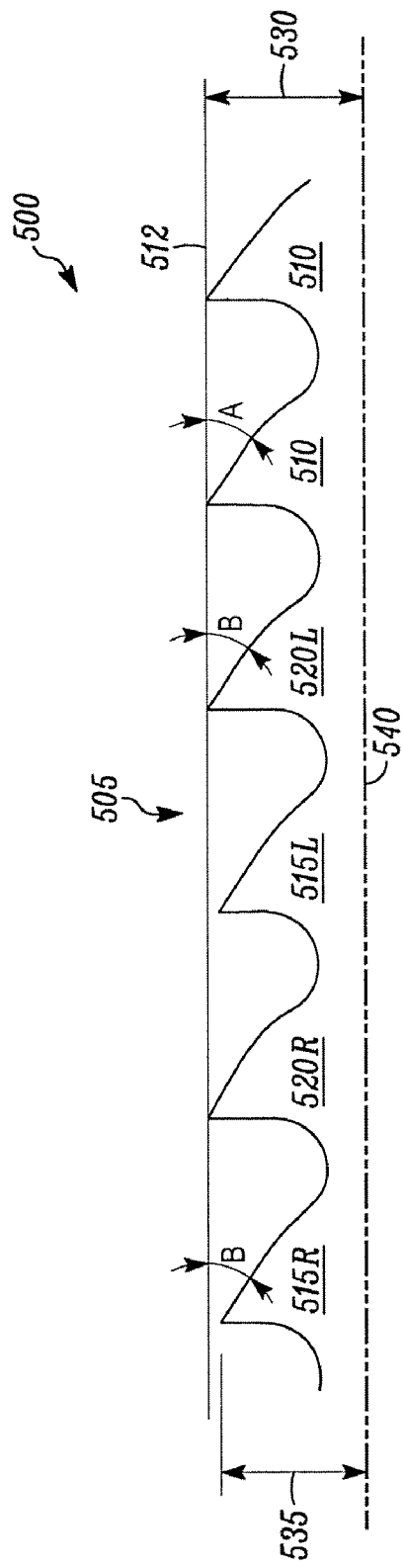

| TEST # | MATERIAL | R&D CONTROL | CHIP MODEL | % BETTER VS. R&D |
|---|---|---|---|---|
| RC668 | A | 15.3 | 20 | 30.7% |
| RC670 | B | 20.1 | 37.8 | 88.1% |
| RC674 | C | 22.9 | 53.5 | 133.6% |
| RC686 | E | 91.6 | 172 | 87.8% |
| RC702 | A | 14.3 | 18.9 | 32.2% |
| RC704 | A | 13.2 | 20.1 | 52.3% |
| RC709 | B | 32.3 | 64.2 | 98.8% |
| RC710 | D | 130 | 169 | 30.0% |
| RC728 | D | 163.8 | 234.3 | 43.0% |

*FIG. 7*

| TEST # | MATERIAL | R&D CONTROL | CHIP MODEL | 6° TANG CHIP MODEL | % BETTER VS. R&D |
|---|---|---|---|---|---|
| RC683 | D | 199.3 | 212.3 | 320.3 | 60.7% |
| RC686 | E | 91.6 | 172 | 171.4 | 87.1% |
| RC687 | D | 216.9 | N/A | 312.5 | 44.1% |
| RC700 | C | 2 | 3.0 | 6.0 | 200.0% |
| RC700 | F | 4 | 5.0 | 12.0 | 200.0% |
| RC702 | A | 14.3 | 18.9 | 26.3 | 83.9% |
| RC704 | A | 13.2 | 20.1 | 33.1 | 150.8% |
| RC728 | D | 163.8 | 234.3 | 328.2 | 100.4% |
| RC729 | B | 48.2 | 54 | 103.3 | 114.3% |

*FIG. 8*

RECIPROCATING SAW BLADE HAVING VARIABLE-HEIGHT TEETH AND RELATED METHOD

CROSS-REFERENCE TO PRIORITY APPLICATION

This patent application claims priority on U.S. Provisional Patent Application Ser. No. 60/934,262 filed Jun. 12, 2007, entitled "Reciprocating Saw Blade Having Variable-Height Teeth And Related Method", which is hereby incorporated by reference in its entirety as part of the present disclosure.

FIELD OF THE INVENTION

The present invention relates to saw blades, and more particularly, to reciprocating saw blades including recurring patterns of high and low teeth and related methods.

BACKGROUND

A reciprocating saw machine is a hand-held power saw that includes a chuck for releasably engaging the saw blade and driving the saw blade in a reciprocating motion through a work piece. The reciprocating motion can be an orbital cutting action, a straight or linear cutting action, or an angled cutting action. Reciprocating saws are sometimes referred to as recip saws, or jig saws, and reciprocating saw blades likewise are sometimes referred to as recip blades or jig saw blades. Reciprocating saws are typically driven by electric motors (e.g., cord or cordless saws), or are pneumatically driven. Well known reciprocating saws are sold under the brand names "Sawzall™" by Milwaukee Electric Tool Corporation and "Tiger Saw™" by Porter-Cable Corporation.

A typical reciprocating saw blade includes a blade portion having a cutting edge defined by a plurality of teeth axially spaced relative to each other along one side of the blade, and a non-working edge formed on an opposite side of the blade relative to the cutting edge. A tang for releasably connecting the blade to the chuck of a reciprocating saw extends from an inner end of the blade. Typical reciprocating saw blades suffer from the need for a trade-off between maximizing wear resistance and maximizing durability. Harder blade materials tend to be more wear resistant, whereas softer blade materials tend to be more durable. Durability is associated with teeth that are robust, resistant to fracture and/or exhibit an ability to withstand impact.

The teeth of a reciprocating saw blade typically include a cutting tip, a rake face formed on one side of the tip, and a clearance surface extending from the tip and formed on an opposite side of the tip relative to the rake face. The rake face forms a rake angle relative to an axis perpendicular to a reference plane, which may be defined by the plane extending between the tips of successive teeth having substantially the same height, such as successive unset teeth. The clearance surface forms a clearance angle relative to the reference plane.

One way to affect the cutting performance of a reciprocating saw blade is to modify the clearance angle of the cutting teeth. For example, increasing the clearance angle may allow the teeth to cut faster. However, teeth with greater clearance angles may be more delicate and thus more likely subject to breakage than teeth with shallower clearance angles.

The need to restrict the clearance angle is especially acute for reciprocating blades, because the reciprocating cutting pattern is very abusive to blade teeth. In contrast to other types of blades such as band saw blades that continuously move in one direction during cutting, reciprocating blades oscillate back and forth through a work piece in an orbital, linear and/or angular cutting action, and thus create substantial forces on all sides of the teeth.

In addition, because a reciprocating blade must accelerate from zero to maximum speed and back again to zero during each stroke, the blade is at optimal cutting speed during only a portion of the forward stroke, typically less than about 50% of the forward stroke. Furthermore, the length of each stroke is very short, i.e., typically about ¾ inch to about 1¼ inches. As a result, reciprocating saw blades have relatively short repeating tooth patterns of about ½ inch or less to maximize the number of repeat patterns of teeth.

Prior art band saw blades have employed high-low teeth and varying clearance angles. For example, some band saw blades have recurring patterns of groups of teeth wherein each group includes teeth with relatively high tips and teeth with relatively low tips. Band saw blades also have employed teeth with varying clearance angles. Conventional wisdom generally has taught away from applying high-low teeth and/or teeth with relatively steep clearance angles (e.g., about 35° or greater) to reciprocating saw blades. As indicated above, in stark contrast to band saws, for example, reciprocating saws are hand-held power saws that subject the recip blades to an abusive reciprocating cutting action. Thus, not only are the rake faces subject to substantial cutting forces, but the clearance surfaces formed on the back sides of the teeth likewise are subject to substantial cutting forces on the return strokes. Recip blades are particularly susceptible to failure from tooth fracture or chipping. Accordingly, it has been believed that if high-low teeth were applied to a recip blade, the relatively high teeth would be overly exposed and subjected to excessive cutting forces, and thus more likely subject to fracture or chipping. Similarly, it has been believed that if relatively steep clearance angles were applied to recip teeth (e.g., about 35° or greater) any teeth with such narrow included angles would be too delicate to withstand the relatively abusive reciprocating cutting action and associated cutting forces, and therefore would be subject to premature fracture or chipping. Accordingly, the performance of prior art recip blades, such as cutting life and/or durability, have not always been at levels desired.

It is an object of the present invention to overcome one or more of the above-described drawbacks and/or disadvantages of the prior art.

SUMMARY OF THE INVENTION

In accordance with a first aspect, the present invention is directed to a reciprocating saw blade for use in a portable power reciprocating saw including a chuck for releasably engaging the saw blade. The reciprocating saw blade comprises a tang having an elongated axis and engageable with the chuck of the reciprocating saw for attaching the saw blade to the reciprocating saw. A blade portion has a cutting edge defined by a plurality of cutting teeth. The cutting teeth define a repeating pattern of successive groups of teeth, each group of teeth is less than about a half inch in length, includes a plurality of set teeth, at least one relatively high tooth, and at least one relatively low tooth. Prior to tooth set the at least one relatively high tooth is at least about 0.002 inch higher than the at least one relatively low tooth. In some embodiments of the present invention, the difference in height prior to tooth set between the at least one relatively high tooth and the at least one relatively low tooth is within the range of about 0.003 inch to about 0.006 inch, and in some such embodiments is within the range of about 0.0035 inch to about 0.005 inch.

In currently preferred embodiments of the present invention, the relatively high teeth define at least one first clearance angle, and the relatively low teeth define at least one second clearance angle that is greater than the first clearance angle. Preferably, the first clearance angle is less than or equal to about 35°, and the second clearance angle is greater than about 35°. In some embodiments, the first clearance angle is within the range of about 25° to about 35°, and the second clearance angle is within the range of about 35° to about 45°.

In some embodiments of the present invention, each group of teeth includes at least one unset leading tooth, and a plurality of set trailing teeth. In some such embodiments, the at least one unset leading tooth is a relatively high tooth, and at least one of the plurality of set trailing teeth is a relatively low tooth. In some such embodiments, at least one of the set trailing teeth is a relatively high tooth. In some embodiments, a plurality of the set trailing teeth define different set magnitudes relative to each other. In some such embodiments, the plurality of set trailing teeth includes at least one first set tooth defining a relatively heavy set magnitude, and at least one second set tooth defining a relatively light set magnitude. In some such embodiments, the at least one first set tooth defining a heavy set magnitude is a relatively low tooth, and the at least one second set tooth defining a relatively light set magnitude is higher than the heavy set tooth. In some such embodiments, the at least one relatively low heavy set tooth defines a steeper clearance angle in comparison to the at least one relatively high light set tooth.

In some embodiments of the present invention, each group of teeth includes unset teeth between first and second pluralities of set teeth. In some such embodiments, each of the first and second pluralities of set teeth includes at least one relatively high set tooth, and at least one relatively low set tooth. In some such embodiments, the unset teeth define at least one first clearance angle, the set teeth define at least one second clearance angle, and the at least one first clearance angle is less than the at least one second clearance angle.

The reciprocating saw causes the reciprocating saw blades of the present invention to move in a reciprocating motion between a rear most position and a forward most position. The reciprocating motion defines an axis of motion extending between i) a first position of a reference point of the saw blade when the saw blade is in the rear most position, and ii) a second position of the reference point when the saw blade is in the forward most position. The cutting edge of the recip saw defines an approximate cutting line extending between the tips of successive teeth having substantially the same height. In accordance with another aspect of the present invention, the cutting line is oriented at an acute angle of greater than about 3° relative to the axis of motion. In some such embodiments, the acute angle is within the range of about 4½° to about 6°. In some embodiments, the tang defines an elongated axis oriented at an acute tang angle relative to the cutting line, and the acute tang angle at least contributes to orienting the cutting line at an acute angle of greater than about 3° relative to the axis of motion.

In some embodiments of the present invention, each group of teeth includes at least one first relatively high unset tooth, a first plurality of set teeth following the first relatively high unset tooth and set to one side of the blade portion, at least one second relatively high unset tooth following the first plurality of set teeth, and a second plurality of set teeth following the at least one second relatively high unset tooth and set to an opposite side of the blade portion relative to the first plurality of set teeth. In some such embodiments, a plurality of at least one of the first and second pluralities of set teeth define different set magnitudes and different heights relative to each other. In some such embodiments, at least one of the first and second pluralities of set teeth includes at least one intermediate height tooth that is relatively light set, and at least one low tooth that is relatively heavy set. The intermediate height tooth defines a height between the heights of the relatively high and low teeth, and the difference in height between each intermediate height tooth and adjacent high and low teeth prior to tooth set is at least about 0.002 inch.

In some embodiments of the present invention, each group of teeth defines a variable pitch pattern, including at least one relatively coarse pitch and at least one relatively fine pitch. In some such embodiments, each group of teeth includes an unset raker tooth defining a relatively coarse pitch.

In accordance with another aspect, the present invention is directed to a method comprising the following steps:

Mounting within the chuck of a reciprocating saw a reciprocating saw blade including a tang having an elongated axis and a blade portion having a cutting edge defined by a plurality of cutting teeth. The cutting teeth define a repeating pattern of successive groups of teeth, each group of teeth is less than about a half inch in length, and includes a plurality of teeth of different species, including a plurality of set teeth, at least one relatively high tooth, and at least one relatively low tooth. Prior to tooth set the at least one relatively high tooth is at least about 0.002 inch higher than the at least one relatively low tooth;

Driving the reciprocating saw blade with the reciprocating saw in a reciprocating cutting action between forward and backward strokes; and Cutting the work piece by engaging the work piece with the reciprocatingly driven reciprocating saw blade and, in turn, during each of a plurality of forward strokes, engaging multiple teeth of the same species with the work piece, bearing a relatively higher chip load with the relatively high teeth in comparison to the relatively low teeth, protecting the relatively low teeth from chipping or damage with the preceding relatively high teeth, and cutting the work piece with the relatively low teeth at a higher speed in comparison to the relatively high teeth.

The driving step comprises driving the reciprocating saw blade in a reciprocating motion between a rear most position and a forward most position. The reciprocating motion defines an axis of motion extending between i) a first position of a reference point of the saw blade when the saw blade is in the rear most position, and ii) a second position of the reference point when the saw blade is in the forward most position. The cutting edge defines an approximate cutting line extending between the tips of successive teeth having substantially the same height. In accordance with another aspect of the present invention, the method further comprises the step of positioning or orienting the cutting line at an acute angle of greater than about 3° relative to the axis of motion. In some such embodiments, the step of positioning or orienting the cutting line at an acute angle includes: (i) providing the tang so that the elongated axis of the tang defines an acute angle relative to the cutting line, and/or (ii) mounting the tang within the chuck so that the cutting line is oriented at an acute angle relative to the axis of motion.

One advantage of the reciprocating saw blades of the present invention is that the height differential between cutting teeth can provide significantly improved performance, such as improved cutting speed and/or durability, in comparison to prior art recip blades. Accordingly, the reciprocating saw blades of the present invention are capable of withstanding higher cutting forces, providing increased chip production, and improved cutting speeds in comparison to prior art reciprocating saw blades.

Other advantages of the currently preferred embodiments of the present invention include the provision of sturdy, wear-resistant cutting edges that better withstand higher cutting forces and enable increased cutting speeds. The high teeth with relatively shallow clearance angles are sturdier than the low teeth with relatively steep clearance angles, and thereby protect the less sturdy lower teeth. Thus, because the lower teeth are protected, they can possess much steeper clearance angles than those of typical reciprocating saw blades, and thus can cut faster and with less feed force. Accordingly, a significant advantage of the tooth patterns of the currently preferred embodiments of the present invention is that the relatively steep clearance angles facilitate enhanced cutting speed while the teeth with shallower clearance angles facilitate enhanced durability. Accordingly, the reciprocating saw blades of the present invention are capable of providing significantly improved blade life, and cutting performance throughout the blade life, in comparison to conventional reciprocating saw blades.

Yet another advantage of some currently preferred embodiments of the present invention is that the acute cutting angle formed between the plane defined by the cutting edge and the plane defined by the reciprocating motion of the saw can further enhance cutting speed without materially impacting the durability of the blade. In some embodiments, this acute angle is at least partially a result of the tang extending at an acute angle relative to the cutting edge (e.g., a line extending between the tips of successive unset teeth or teeth of the same height). The steeper the cutting angle, the greater is the height differential between the high and low teeth, and thus the effect on cutting performance provided by such height differential. Yet another advantage is that the acute cutting angle formed between the cutting edge plane and the plane defined by the reciprocating motion of the saw does not increase the load on the clearance surfaces of the teeth on the return stroke of the blade, thereby further enhancing performance without reducing durability.

Other objects and advantages of the present invention and/or embodiments thereof will become readily apparent in view of the following detailed description of currently preferred embodiments and accompanying drawings.

BRIEF DESCRIPTION OF THE DRAWINGS

FIG. 4 is a side elevational view of another embodiment of a repeating tooth pattern of a reciprocating saw blade;

FIG. 5 is a side elevational view of another embodiment of a repeating tooth pattern of a reciprocating saw blade;

FIG. 7 is a table showing test results of an embodiment of the reciprocating saw blade of the present invention as compared to a prior art reciprocating saw blade;

FIG. 8 is a table showing test results of embodiments of the reciprocating saw blade of the present invention as compared to prior art reciprocating saw blades;

DETAILED DESCRIPTION OF PREFERRED EMBODIMENTS

Figure 1A:
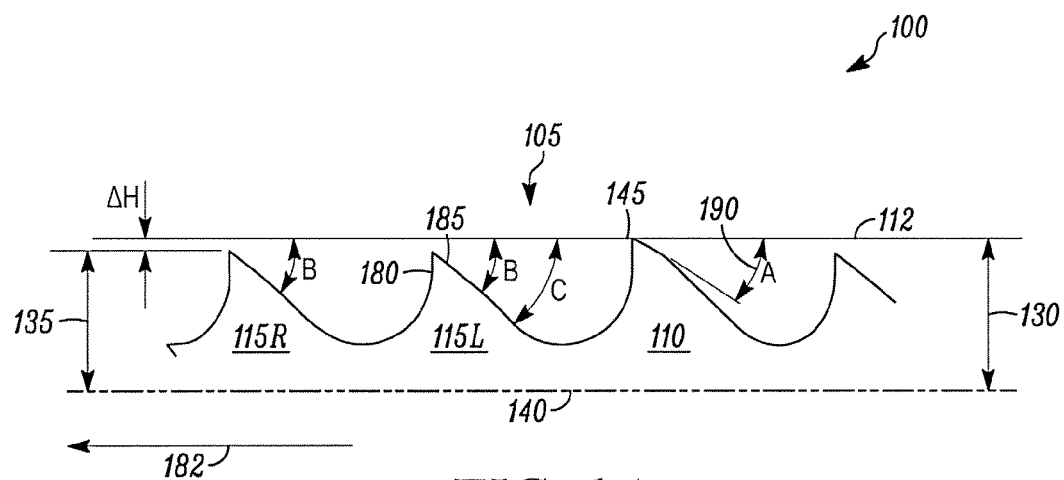
FIG. 1A is a side elevational view of an embodiment of a repeating tooth pattern of a reciprocating saw blade.
Figure 1B:
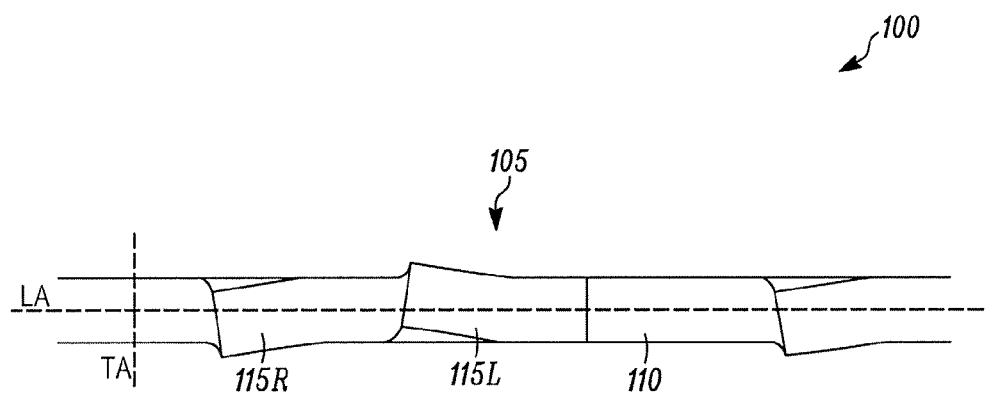
FIG. 1B is a top plan view of the repeating tooth pattern of FIG. 1A.

In FIGS. 1A and 1B, a first embodiment of a reciprocating saw blade of the present invention is indicated generally by the reference numeral 100. The saw blade 100 is used in a reciprocating saw. A reciprocating saw is a portable power saw that is typically hand-held and includes a chuck for releasably engaging the saw blade and driving the saw blade in a reciprocating motion. Reciprocating saws are sometimes referred to as recip saws or jig saws and these terms are used synonymously herein. Reciprocating saws are typically driven by an electric motor (cord or cordless), or are pneumatically driven. Reciprocating saws are driven in any of a variety of cutting actions, including orbital, linear and/or angled. Reciprocating saw blades are blades that include at least one tang for mounting the blade within the chuck of a reciprocating saw. Reciprocating saw blades are sometimes referred to as recip blades or jig saw blades and these terms are used synonymously herein.

The recip saw blade 100 comprises a plurality of recurrent or repetitive patterns of teeth, i.e., tooth patterns 105, that have variable heights and clearance angles. As shown in FIG. 1B, the saw blade 100 defines a longitudinal axis "LA", and a transverse axis "TA" that extends between the sides of the saw blade 100. Preferably, the transverse axis TA is normal to the sides of the saw blade 100 and/or the longitudinal axis LA.

As shown typically in FIGS. 1A and 1B, each tooth pattern includes a plurality of teeth having at least one high tooth and at least one low tooth. The teeth having a greater height may be referred to as "high teeth", and the teeth having a lower height may be referred to as "low teeth". In the present embodiment, the high teeth in each group have a greater height and a shallower, i.e., smaller, clearance angle than do the lower teeth in the group.

In the embodiment shown in FIGS. 1A and 1B, the repeating tooth pattern 105 is a three-tooth pattern that includes an unset leading, or raker tooth 110, a first trailing set tooth 115R, and a second trailing set tooth 115L. As shown in FIG. 1B, the trailing teeth 115R and 115L are set laterally to opposite sides of the blade relative to each other. Thus, the sides of the set teeth 115R and 115L form an oblique angle relative to a respective side of the blade 100, and an outer corner of each of the set teeth extends laterally from the respective side of the blade. As can be seen in FIG. 1B, when viewed from the cutting direction of the saw blade, the set tooth 115L is set to the left of the blade 100 and thus is referred to as a "left set" tooth, and the set tooth 115R is set to the right of the blade 100 and thus is referred to as a "right set" tooth. As used herein, the designation "L" refers to a left-set tooth, and the designation "R" refers to a right-set tooth.

As shown in FIG. 1A, the unset tooth 110 defines a first height 130, and the set teeth 115L and 115R define a second height 135. As can be seen, the height 130 of the unset tooth is greater than the height 135 of the set teeth, and the height differential between the set and unset teeth is referred to as ΔH. The height of each tooth in this and other embodiments of the present invention described herein is measured as the distance between a tip (e.g., the tip 145) of the respective tooth and a selected reference plane of the blade 100 located below the tip. In FIG. 1A, the cutting edge 112 is represented by a line extending between the tips 145 of the successive unset teeth 110, and a reference plane that is parallel to the back edge of the blade (not shown) is indicated by the broken line 140. Accordingly, in the illustrated embodiment, the heights 130, 135 of the teeth are measured as the distance between the respective tip and the reference plane 140. However, as may be recognized by those of ordinary skill in the pertinent art based on the teachings herein, the tooth heights may be measured relative to the back edge or any other reference plane located below the tips of the teeth. In addition, in this embodiment, and the other embodiments of the invention described herein, the heights of the set teeth are measured prior to tooth set. Although the heights of the set teeth may be measured after the teeth are set, and thus the height differential between high and low teeth may be determined after the teeth are set, it is typically easier to measure and/or determine the heights and height differentials prior to the teeth being set.

In the illustrated embodiment, the difference in height ΔH prior to tooth set between the height 130 of the high unset teeth and the height 135 of the low set teeth is at least about 0.002 inch, is preferably within the range of about 0.003 inch to about 0.006 inch, and most preferably is within the range of about 0.0035 inch to about 0.005 inch. Note that although the figures herein show the height differential ΔH as the difference between the heights of the set and unset teeth, the measurements provided herein are the ΔH measurements prior to, and not after tooth set. Although in the current embodiment the set teeth 115L, 115R have the same height, they may alternatively define any combination of height differentials, provided that each of the heights of the set teeth 115L, 115R is lower than the height 130 of the respective unset teeth of the same group. The height differential ΔH between the high and low teeth may be varied depending upon a variety of factors, such as the type of material to be cut, the materials of construction of the saw blade, and the desired cutting performance, such as the desired cutting speed and/or the desired blade life. Accordingly, the tooth heights and height differentials described herein are only exemplary and can be changed as desired, or otherwise as deemed necessary to meet the requirements of a particular application.

Each of the teeth in tooth pattern 105 defines a rake surface 180, and at least one clearance surface 185 extending from the tip 145 and located on an opposite side of the tip relative to the rake surface 180. As shown in FIG. 1A, each clearance surface 185 defines a clearance angle 190 relative to a reference plane, such as the cutting edge 112. In the illustrated embodiment, the relatively high unset tooth 110 defines a smaller clearance angle than that of the lower set teeth 115R, 115L.

As shown in FIG. 1A, each high unset tooth 110 includes a primary clearance surface defining a first primary clearance angle "A", and each low set tooth 115L, 115R includes a primary clearance surface defining a second primary clearance angle "B". Each tooth 110, 115 also includes a secondary clearance surface that extends between the respective first clearance surface defining the clearance angle A or B and the gullet. Each secondary clearance surface defines a secondary clearance angle "C". In the illustrated embodiments of the present invention, the first clearance angle A of the high unset teeth is preferably less than about 35°, more preferably is within the range of about 25° to about 35°, and most preferably is within the range of about 28° to about 33°. In the embodiment of FIGS. 1A and 1B, the first clearance angle A is about 30°. Also in the illustrated embodiments of the present invention, the second clearance angle B is preferably greater than about 35°, more preferably is within the range of about 35° to about 45°, and most preferably is within the of about 38° to about 43°. In the embodiment of FIGS. 1A and 1B, the second clearance angle B of the low set teeth is about 40°. The third clearance angle C is preferably greater than the respective first or second primary clearance angles A or B, and in the illustrated embodiments is about 45°. In some embodiments of the present invention, the third clearance angle C for the relatively low teeth is greater than the third clearance angle C for the relatively high teeth. Although these clearance angles and ranges are described with reference to the embodiment of FIGS. 1A and 1B, they equally may be applied to the other embodiments of the present invention disclosed herein. In addition, as may be recognized by those of ordinary skill in the pertinent art based on the teachings herein, the specific height differentials and clearance angles described herein are only exemplary, and numerous other height differentials, clearances angles, and combinations thereof equally may be employed depending upon any of numerous different factors, such as the material to be cut, the desired cutting speed, and/or the desired wear life of the blades. In addition, if desired, the high and low teeth may have the same clearance angle, the higher teeth may have variable clearance angles, and/or the lower teeth may have variable clearance angles.

Figure 2A:
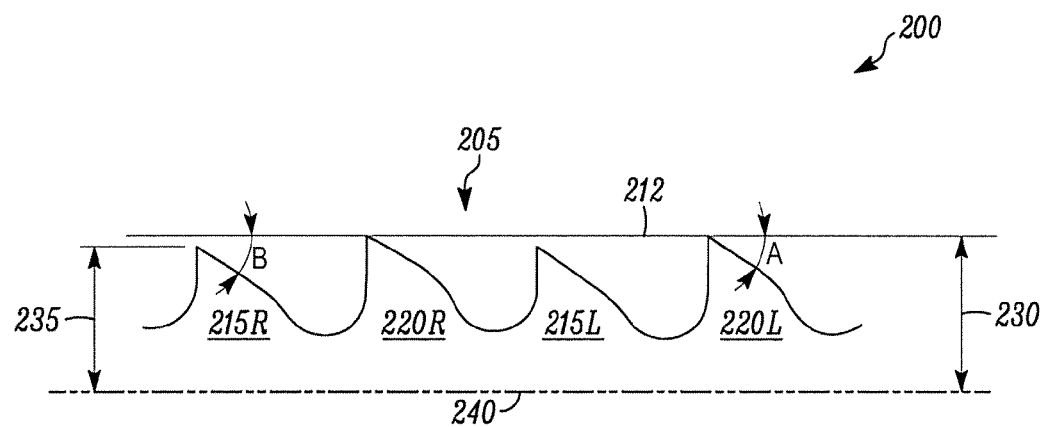
FIG. 2A is a side elevational view of another embodiment of a repeating tooth pattern of a reciprocating saw blade.
Figure 2B:
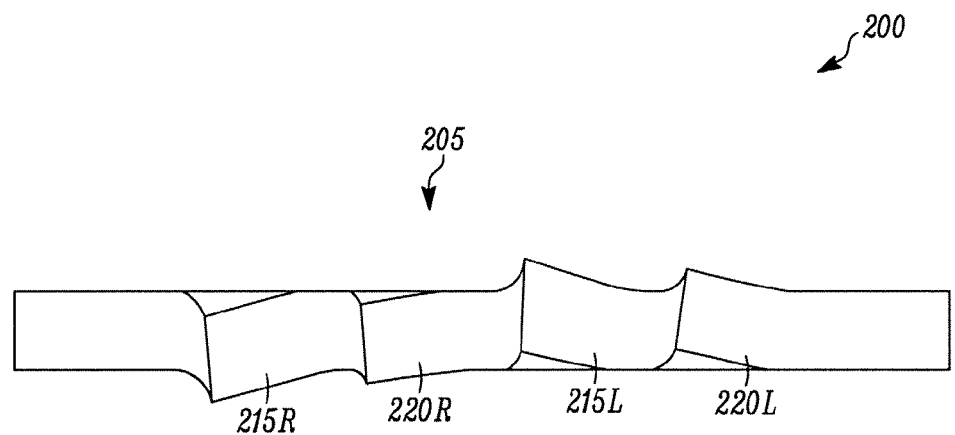
FIG. 2B is a top plan view of the repeating tooth pattern of FIG. 2A.

FIGS. 2A and 2B show a blade 200 having a four-tooth repeating pattern 205. The features of the recip blade 200 are similar to the recip blade 100 with the exception of the features described below, and therefore like reference numerals preceded by the numeral "2" instead of the numeral "1" are used to indicate like elements.

As shown in FIGS. 2A and 2B, both the high and low teeth may be set, and the teeth may be set to varying degrees. The four-tooth pattern 205 includes two pairs of set teeth, each pair having different set magnitudes. A first pair of high set teeth 220R, 220L has a first height 230 measured with respect to the reference plane 240, and a second pair of low set teeth 215R, 215L has a second lower height 235 measured with respect to the reference plane 240. As can be seen, the first height 230 of the teeth 220R, 220L is greater than second height 235 of the teeth 215R, 215L. The high set teeth 220R, 220L are set to a first set magnitude, and the low set teeth 215R, 215L are set to a second magnitude that is greater than the first set magnitude of the high teeth. Thus, the corners of the low set teeth 215R, 215L extend laterally farther than do the corners of the respective high set teeth 220R, 220L. In addition, the low set teeth 215R, 215L define a steeper second clearance angle B than the first clearance angle A of the higher set teeth 220R, 220L. In the illustrated embodiment, the low set teeth 215R, 215L each have a relatively steep second clearance angle B of about 40°, and the high set teeth 220R, 220L each have a relatively shallow first clearance angle A of about 30°. As can be seen, in this embodiment, the high set teeth 220R, 220L are located between respective low set teeth 215R, 215L, and vice versa, so that they form pairs of successive teeth set in the same direction. As shown in FIG. 2B, the first successive pair of teeth 215R, 220R is set to the right, and the second successive pair of teeth 215L, 220L is set to the left. One advantage of this and other embodiments of the present invention is that the low set teeth 215L, 215R provide relatively steep, aggressive cutting surfaces to facilitate faster cutting seeds, while the relatively high set teeth 220L, 220R protect the respective low teeth 215L, 215R to facilitate improved blade life.

Figure 3A:
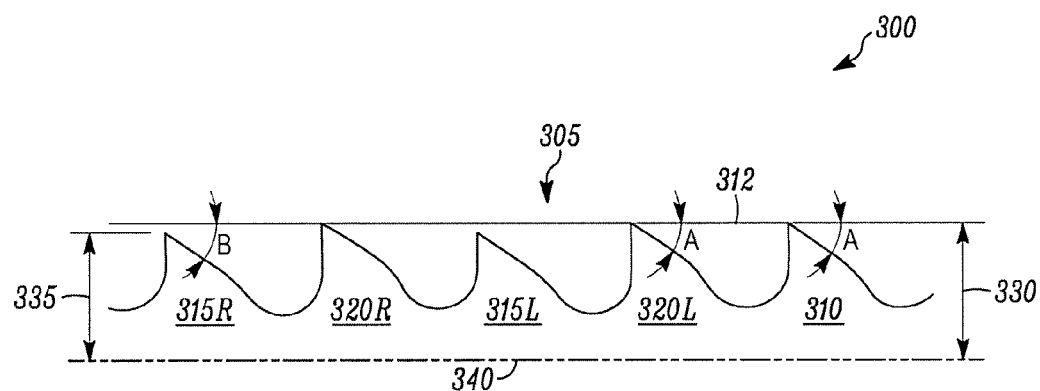
FIG. 3A is a side elevational view of another embodiment of a repeating tooth pattern of a reciprocating saw blade.
Figure 3B:
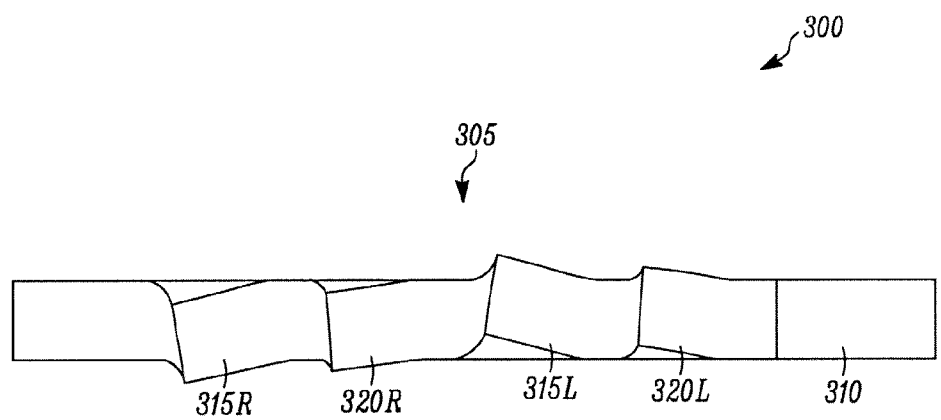
FIG. 3B is a top plan view of another embodiment of the repeating tooth pattern of FIG. 3A.

FIGS. 3A and 3B show a blade 300 that is similar to the blade 200, with the addition of an unset raker tooth. The features of blade 300 are similar to the blade 200 with the exception of the features described below, and therefore like reference numerals preceded by the numeral "3" instead of the numeral "2" are used to indicate like elements. The blade 300 defines a five-tooth pattern 305 that includes an unset raker tooth 310 having a first height 330, a first pair of high set teeth 320R and 320L also having a first height 330, and a second pair of low set teeth 315R and 315L having a second height 335. As can be seen, the unset raker tooth 310 is followed by a low right set tooth 315R, a high right set tooth 320R, a low left set tooth 315L and a high left set tooth 320L. As can be seen, tooth height is measured relative to the reference plane 340. As with the other embodiments illustrated herein, although all of the high teeth are shown as having the same height 330, these teeth exhibit the same tooth height prior to tooth set; however, after tooth set the outer corners of the high set teeth are slightly lower than the outer corners of the high unset teeth. The term "outer corner" is used herein to mean the corner of the respective tooth laterally spaced furthest from the centerline of the blade. The first height 330 of the high teeth is greater than the second height 335 of the low teeth. As shown in FIG. 3B, high set teeth 320R and 320L are set to a first set magnitude, and the low set teeth 315R and 315L are set to a second magnitude that is greater than the first set magnitude.

In the illustrated embodiment, the high unset raker tooth 310, and the set teeth 320R, 320L, each define a first clearance angle A that is relatively small or shallow as compared to the second clearance angle B of the low set teeth 315R, 315L. Alternatively, if desired, the high set teeth 320R, 320L may also define a relatively steep second clearance angle B that is the same as or different from the second clearance angle B of the low set teeth 315R, 315L. In one example, the low set teeth 315R, 315L define a second clearance angle B of about 40°, and the high unset raker tooth 310 and high set teeth 320R, 320L define a relatively shallow first clearance angle A of about 30°.

FIG. 4 shows a blade 400 having a six-tooth pattern 405 that includes pairs of set teeth with unset raker teeth located between the pairs of set teeth. Otherwise, the features of the recip blade 400 are similar to the recip blade 300 with the exception of the features described below, and therefore like reference numerals preceded by the numeral "4" instead of the numeral "3" are used to indicate like elements.

The six-tooth pattern 405 includes two unset raker teeth 410 having a first height 430, two high set teeth 420R and 420L also having a first height 430 prior to tooth set, and two low set teeth 415R and 415L having a second height 435 prior to tooth set. In the illustrated embodiment, the tooth height is measured relative to the reference plane 440. The first height 430 of the unset raker teeth 410 and high set teeth 420R, 420L is greater than second height 435 of the low set teeth 415R, 415L. The high set teeth 420R, 420L are set to a first set magnitude, and the low set teeth 415R, 415L are set to a second set magnitude that is greater than the first set magnitude. Accordingly, the tooth pattern of this embodiment is defined by a high unset raker tooth 410, followed by a high, light left set tooth 420L, a low, heavy right set tooth 415R, a high unset raker tooth 410, a low, heavy left set tooth 415L, and a high, light right set tooth 420R. In this embodiment, the unset raker teeth 410 each define a first clearance angle A that is relatively small compared to the second clearance angle B of both the high and low set teeth. In the illustrated embodiment, the high set teeth 420R, 420L define substantially the same clearance angle B as the low set teeth 415R, 415L. In one example, the low set teeth 415R, 415L and the high set teeth 420R, 420L each define a second clearance angle of about 40°, and high unset raker teeth 410 each define a first clearance angle of about 30°. However, as may be recognized by those of ordinary skill in the pertinent art based on the teachings herein, these clearance angles are only exemplary, and numerous other clearance angles may be employed. For example, the relatively high set teeth 420R, 420L may define clearance angles that are more shallow than the clearance angles B of the low set teeth 415R, 415L, or may define the same clearance angle as the unset raker teeth 410.

FIG. 5 shows a blade 500 having a six-tooth pattern 505 that includes a pair of unset raker teeth, followed by a first pair of right set teeth defining different heights and set magnitudes relative to each other, and a second pair of left set teeth defining different heights and set magnitudes relative to each other. Otherwise, the features of the blade 500 are similar to the blade 300 with the exception of the features described below, and therefore like reference numerals preceded by the numeral "5" instead of the numeral "3" are used to indicate like elements.

The six-tooth pattern 505 includes two unset raker teeth 510 having a first height 530, two first high set teeth 520R and 520L also having a first height 530 prior to tooth set, and two second low set teeth 515R and 515L having a second height 535 prior to tooth set. In the current embodiment, height is measured relative to the reference plane 540. The first height 530 of the unset raker and high set teeth is greater than second height 535 of the low set teeth. As can be seen, the two high unset raker teeth 510 are followed by the pair of right set teeth 515R, 520R, which are in turn followed by the pair of left set teeth 515L, 520L. The high set teeth 520R, 520L are set to a first set magnitude, and the low set teeth 515R, 515L are set to a second magnitude greater than the first set magnitude (i.e., the low teeth are "heavy set" and the high teeth are "light set"). In this embodiment, the unset raker teeth 510 each define a first clearance angle A that is relatively small compared to the second clearance angle B of the set teeth 515R, 520R, 515L, 520L. In one example, the low set teeth 515R, 515L and the high set teeth 520R, 520L each define a second clearance angle B of about 40°, and the high unset raker teeth 510 each define a first clearance angle B of about 30°. However, as may be recognized by those of ordinary skill in the pertinent art based on the teachings herein, any of numerous other clearance angles equally may be employed. For example, the high set teeth may define more shallow clearance angles than the low set teeth, or may define substantially the same clearance angles as the raker teeth.

If desired, the reciprocating saw blades may be designed such that the unset teeth are the low teeth defining relatively steep clearance angles, and the set teeth are the high teeth defining relatively shallow clearance angles. Thus, the variable heights and clearance angles may be reversed in comparison to that shown above. In addition, if desired, the high and low teeth may define substantially the same clearance angles. In addition, although the low teeth described above are shown as having substantially the same height, the heights among the low teeth may vary (while remaining lower than the high teeth). Similarly, in tooth patterns having multiple high teeth, the high teeth all may have substantially the same height, or the heights may vary among the high teeth.

In the embodiments shown in FIGS. 1A and 3A-5, the unset tooth or teeth have substantially the same rake angle as the set teeth. The term "rake angle" refers to the angle of the tooth face relative to a line perpendicular to the reference plane, such as the reference plane parallel to the back edge of the blade described above, another reference plane extending between the tips of successive unset teeth or other successive teeth having substantially the same height as each other, and/or an axis of motion defined by the reciprocating motion of the reciprocating saw. The rake angle is positive when the tooth angles forwardly with respect to the forward direction of the reciprocating cutting action, and negative when the tooth angles rearwardly with respect to the forward direction of the reciprocating cutting action. As shown in FIG. 1A, the forward or cutting direction of the recip blade is indicated by the arrow 182. In other embodiments, the unset tooth or teeth may have a rake angle that is different than the rake angles of the set teeth. In the illustrated embodiments, all of the teeth have a rake angle that is about zero degrees. However, if desired, the low teeth may be provided with positive rake angles (i.e., such that the base of the rake face is rearward of the tip), or may be provided with more positive rake angles than the high teeth, to further facilitate achieving faster cutting speeds.

In those embodiments showing multiple pairs of set teeth, e.g., FIGS. 2A-5, a variable set magnitude is shown. Alternatively, if desired, the pairs of set teeth may all have the same or substantially the same set magnitude.

Each tooth in the above-described tooth patterns defines a respective tooth spacing measured between the tips of adjacent teeth, or if desired, measured between any of numerous other corresponding points between adjacent teeth. The tooth spacing is the inverse of the tooth pitch (i.e., 1/pitch). Thus, for example, an "18 pitch" tooth spacing is $1/18$ or about 0.055 inch point to point between adjacent teeth. In the previously described embodiments, the tooth spacing is substantially constant throughout the tooth patterns. However, the tooth spacing may vary between teeth, and/or may vary according to a predetermined pattern among the teeth of the tooth pattern. Each tooth pattern also defines a respective number of teeth per inch ("TPI"). The currently preferred embodiments of the present invention fall within the range of about 6 TPI to about 24 TPI, and include without limitation 6, 8, 10, 14, 18 and 24 TPI. As an example of the relationship between TPI and pitch, 6 TPI corresponds to 0.166 pitch (i.e., $1/6$), 18 TPI corresponds to 0.056 pitch, and 24 TPI corresponds to 0.041 pitch.

Figure 6:
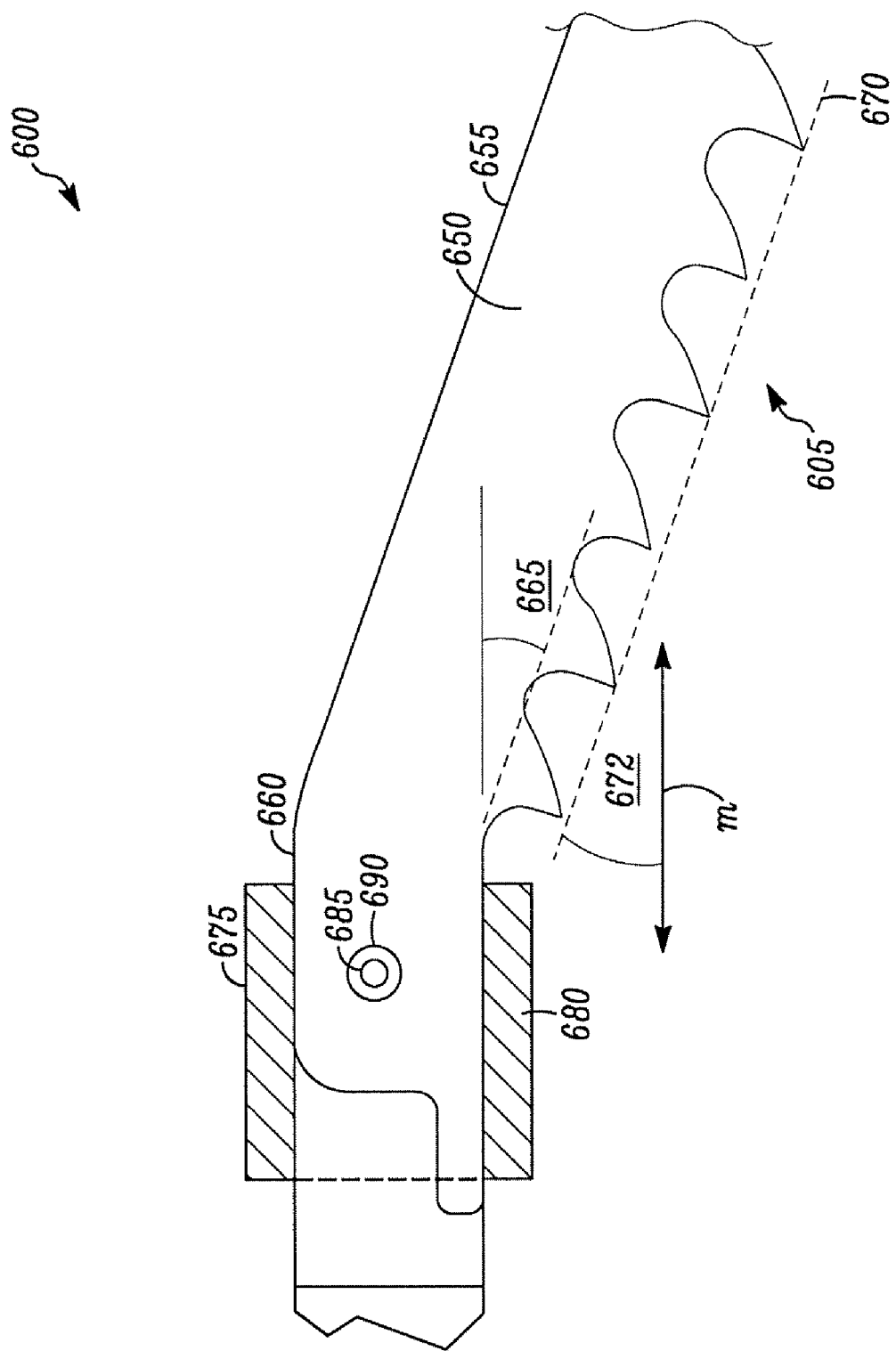
FIG. 6 is a partial, side elevational view of a reciprocating saw blade mounted within a chuck of a reciprocating saw.

Turning to FIG. 6, another reciprocating saw blade is indicated generally the reference numeral 600. The recip blade 600 is substantially similar to the recip blades described above, and therefore like reference numerals preceded by the numeral "6" or preceded by the numeral "6" instead of another lead numeral, are used to indicate like elements. The reciprocating saw blade 600 includes an elongated blade portion 650 having a repeating tooth pattern 605 opposite a back edge 655. A tang 660 extends from an inner end of the blade portion 650 to allow the blade 600 to be releasably engaged with a chuck 675 or other clamping device of a reciprocating saw. As indicated by the arrow in FIG. 6, the reciprocating saw causes the saw blade 600 to move in a reciprocating motion defined by a forward stroke to the right in the figure, and a rearward stroke to the left in the figure. During each stroke, the recip blade 600 moves between a rear most position to the left in the figure and a forward most position to the right in the figure. The chuck 675 engages the tang 660 in manner known to those of ordinary skill in the pertinent art to releasably secure the recip blade to the reciprocating saw. The chuck 675 may take the form of any of numerous chucks or other clamping mechanisms of reciprocating saws that are currently known, or that later become known, and may include, for example, a retaining collar 680 that receives the tang to secure the tang to the reciprocating saw. The tang 660 may have one or more tang apertures 690, and the collar 680 may have one or more collar apertures 685 to allow a connecting element such as a stud or a pin to be inserted therethrough to secure the recip blade to the saw.

As shown in FIG. 6, the recip blade 600 defines an acute cutting angle 672 formed between (i) a cutting line defined by the teeth of the recip blade 600, such as a line extending between the tips of consecutive unset teeth of the same height, and (ii) an axis, i.e., an axis of motion, shown for example as an axis "M" in FIG. 6, defined by the reciprocating motion of the recip blade 600. The axis of motion M extends between i) a first position of a reference point of the saw blade when the saw blade is in the rear most position to the left in the figure, and ii) a second position of the reference point when the saw blade is in the forward most position to the right in the figure. The reference point may be any point located on the saw blade 600.

In the current embodiment, the tang 660 is positioned at an acute angle relative to the blade portion 650, so that an elongated axis of the tang 660 defines an acute tang angle 665 relative to the cutting line defined by the cutting edge 670. As shown in FIG. 6, the tang angle 665 is substantially equal to the cutting angle 672 formed between the cutting line and the axis of motion M. However, in other embodiments, the cutting angle 672 may be different than the tang angle 665. For example, the tang angle 665 may be smaller than the cutting angle 672, and the tang 660 may be mounted in the chuck 675 at an acute angle relative to the axis M of the reciprocating motion to achieve a desired cutting angle 672. Thus, the desired cutting angle 672 may be achieved solely by providing a desired tang angle 665, by an angular mounting of the blade 600 on the reciprocating saw, or by a combination of the tang angle 665 with an angular mounting of the blade 600 on the reciprocating saw.

The cutting angle 672 is preferably greater than about 3°. As a general matter, the greater the cutting angle 672, the greater is the effect of the increased cutting angle on the height differential ΔH of the high-low teeth, and thus the greater is the effect on the cutting action of the saw blade. As the cutting angle 672 is increased, it effectively increases the height differential ΔH of the high-low teeth, and thus causes the high teeth to take larger bites out of the work piece than they otherwise would with a lower cutting angle. Yet another advantage of a relatively steep cutting angle is that it may reduce the impact on the clearance surfaces of the teeth during the return stroke. A relatively steep cutting angle is about 4½° or greater. Reciprocating saw blades of the present invention embodying a relatively steep cutting angle preferably define cutting angles within the range of about 4½° to about 6°, and include as exemplary cutting angles 4½°, 5°, 5½° and 6°. However, as may be recognized by those of ordinary skill in the pertinent art based on the teachings herein, the reciprocating saw blades of the present invention may define any of numerous different cutting angles and/or tang angles that are currently known, or that later become known, and may define no cutting angle at all, or a conventional cutting angle (about 3° or less).

In the currently preferred embodiments of the present invention, the repeating tooth patterns include between about 3 and about 10 teeth. Also, the length of each repeating pattern or group of teeth in the cutting direction of the saw blade is preferably less than or equal to about ½ inch. Preferably, the length of the repeat pattern facilitates at least two teeth of like species cutting a work piece during a respective stroke of the reciprocating saw, and the relatively short repeat patterns (about a ½ inch or less) facilitate this goal. As may be recognized by those of ordinary skill in the pertinent art based on the teachings herein, the repeating tooth patterns may include a different number of teeth, or define a different length, depending upon the type of saw blade and/or the application(s) of the blade. The reciprocating saw blades may include more than one repeating pattern, or additional teeth may be located between or among the groups of teeth of the repeating pattern. In some embodiments of the present invention, the tooth patterns are as coarse as feasible for the material to be cut. Preferably, there are at least about 2 to 3 adjacent teeth engaging the work piece at any given time, and most preferably, multiple teeth of the same species engage the work piece during a cutting stroke in order to distribute the cutting loads across the teeth. Accordingly, it may not be desirable to employ relatively long repeat patterns where the teeth of like species are relatively far apart because this will tend to prevent enough teeth of like species engaging the work piece during the same cutting stroke.

One advantage of the tooth patterns of the present invention is that they provide a sturdy, wear-resistant cutting edge with increased cutting efficiency and consequently increased cutting speeds. In the above-described embodiments of the present invention, the high teeth with relatively shallow clearance angles are sturdier than the low teeth and protect the low teeth, which have steeper clearance angles. The high teeth bear a higher chip load and protect the low teeth. Also, the low teeth have corners set within or substantially within the profiles created by the preceding high teeth of like set direction to protect against chipping or damage to the corners of the low teeth.

In some embodiments of the present invention, because the set teeth are lower than the unset leading tooth (or teeth), the corners of the set teeth are either not exposed, or are only slightly exposed outside of the profiles of the preceding unset leading tooth (or teeth). Therefore, the weaker, faster cutting set trailing teeth are substantially protected by the unset leading teeth, thus facilitating increased cutting speeds and/or durability in comparison to prior art recip blades. Thus, the offset trailing teeth may define steeper clearance angles, and if desired, positive rake angles to facilitate a faster speed of cut without reducing the durability of the blade. Furthermore, for those embodiments having set teeth with varying set magnitudes, this configuration not only provides protection to the set teeth, but also increases the cutting power by increasing the cutting surfaces provided by the set teeth.

Thus, because the low teeth are protected, they can possess much steeper clearance angles than those of typical reciprocating saw blades, and can thus cut faster with greater efficiency and with less feed force. Accordingly, the teeth with relatively steep clearance angles facilitate relatively fast cutting speeds, while the high teeth with relatively shallow clearance angles facilitate blade durability. Therefore, the recip blades described herein can provide significantly improved blade life, and cutting performance throughout the blade life, in comparison to prior art recip saw blades.

FIG. 7 illustrates test results of an embodiment of a reciprocating saw blade of the present invention compared to a typical reciprocating saw blade. This embodiment, labeled "Chip Model", has a tooth pattern with a high unset lead raker tooth and low trailing set teeth. The unset lead raker tooth has a clearance angle of about 30°, the trailing set teeth each have a clearance angle of about 40°, and the unset lead raker tooth is about 0.004 inch higher than the trailing set teeth prior to tooth set. This tooth pattern was tested against a typical reciprocating saw blade, labeled "R&D Control", that does not have the height differential or clearance angle features of the "Chip Model" blade.

In FIG. 7, the first column indicates the "Test #", which refers to a distinct test that was performed on a specified material, in which the material was cut a number of times with both the "R&D Control" blade and the "Chip Model" blade to determine how many cuts could be performed on the material before each blade failed. The second column indicates the material being cut (i.e., the materials were of types "A", "B", "C" or "D"), the third column indicates the results (i.e., the number of cuts that each blade performed before failing for each of the different materials being cut) for the "R&D Control", the fourth column indicates the results for the "Chip Model" or blade embodying the present invention (i.e., the number of cuts achieved prior to failure), and the fifth column illustrates the improved results provided by the blade of the present invention (i.e., a comparison of column 4 to column 3).

For each test, the blades were tested in groups of about 6 to 8 blades per group. The number of cuts that each blade performed before failing was averaged to produce the number of cuts listed for each test in FIG. 7. A "cut" as defined in the context of FIGS. 7 and 8 refers to a complete cutting through of a predetermined portion of the material with a reciprocating saw fitted with the blade to be tested. Failure was determined by observing the amount of time, i.e., cutting time, required for a blade to cut through the width of a material, or through the predetermined portion of the material, and comparing the cutting time to a threshold cutting time. Factors including the type of material and amount of downforce applied to the blade were considered in calculating the threshold cutting time. When the time required to make a complete cut of the material exceeded the threshold cutting time, the blade was considered to have failed. In the present embodiment, an average cutting time for each cut was calculated by averaging the cutting time of each of the last three cuts performed, i.e., the current cut and the two immediately previous cuts. When this average cutting time exceeded the threshold cutting time, the blade was deemed to have failed. The number of cuts listed in FIG. 7 is the average number of cuts that a group of either the "R&D Control" or "Chip Model" blades was able to perform before the average cutting time exceeded the threshold cutting time (i.e., failure).

For example, for the case of a blade applied via a reciprocating saw to a 1-inch diameter black pipe, shown as material C in FIG. 7, with about 25 pounds of downforce, the threshold cutting time was determined to be 45 seconds. A blade that would take longer than 45 seconds to cut through the material in this test was considered to have failed. Each blade was applied to the material to perform numerous cuts in the material. The cutting time of each cut was observed, and the average cutting time of the latest three cuts was continuously calculated. As more and more cuts were made, the blade would wear down, and each cut would take longer to complete. Once the average cutting time exceeded the threshold cutting time, the blade was deemed to have failed. The number of cuts made in the material prior to this failure was recorded as a measure of the durability of the blade. The number of cuts recorded for each blade in the group was averaged to determine the number of cuts shown in FIG. 7.

As can be seen, for example, in the test labeled RC674, the "Chip Model" blade was able to make an average of 53.5 cuts before failing, whereas the "R&D Control" blade was only able to make an average of 22.9 cuts before failing. The "Chip Model" blade thus exhibited about 133% greater durability than the "R&D Control" blade. As shown in the table of FIG. 7, the "Chip Model" embodiment of the present invention was generally much more durable, i.e., performed significantly more cuts before failing, than the prior art "R&D Control" blade.

FIG. 8 shows additional test results of the "Chip Model" embodiment compared to a "R&D Control" blade. The "R&D Control" and "Chip Model" blades of FIG. 8 are similar to those of FIG. 7. FIG. 8 also shows test results of an embodiment of a reciprocating saw blade having a cutting angle with respect to the reciprocating motion of the reciprocating saw. This reciprocating saw blade having a cutting angle is labeled "6° Tang Chip Model". This "6° Tang Chip Model" embodiment is similar to the "Chip Model", but also includes a tang angle of about 6°, which in turn defines a cutting angle of about 6°. Both the "6° Tang Chip Model" and the "Chip Model" blades were tested against a typical "R&D Control" saw blade that did not have the height differential or clearance angle features of the "Chip Model" embodiment, or the tang and cutting angle features of the "6° Tang Chip Model" embodiment. The table of FIG. 8 shows the number of cuts that each blade performed on a respective material before failing.

In FIG. 8, the first column indicates the "Test #", which refers to the test that was performed on a specified material, in which the material was cut a number of times with the "R&D Control" blade, the "Chip Model" blade, and the "6° Tang Chip Model" blade to determine how many cuts could be performed on the material before each blade failed. The second column indicates the material being cut (i.e., the materials were of types "A", "B", "C", "D", "E" or "F"), the third column indicates for the "R&D Control" blade the results (i.e., the number of cuts that each blade performed before failing for each of the different materials being cut), the fourth column indicates the results for the "Chip Model" blade, the fifth column indicates the results for the "6° Tang Chip Model" blade, and the sixth column illustrates the improved results provided by the "6° Tang Chip Model" blade of the present invention relative to the "R&D Control" blade (i.e., a comparison of column 5 to column 3).

The procedure for each test indicated in FIG. 8 is similar to each of the tests indicated in FIG. 7. In each case the blades were tested in groups of about 6 to 8 blades per group. The number of cuts that each blade performed before failing for each blade was averaged to produce the number of cuts listed for each test in FIG. 8. Failure was determined by observing the cutting time required for a blade to cut through the width of a material, or through a predetermined portion of the material, and comparing the cutting time to the threshold cutting time. The number of cuts indicated in FIG. 8 is the average number of cuts that a group of either the "R&D Control", "Chip Model" or "6° Tang Chip Model" blade was able to perform before the average cutting time exceeded the threshold cutting time (i.e., failure). As shown in the table of FIG. 8, both the "6° Tang Chip Model" and "Chip Model" embodiments exhibited significantly improved durability, i.e., performed significantly more cuts before failing, than the prior art "R&D Control" blade.

FIGS. 9-12 show additional exemplary reciprocating saw blades embodying the present invention. The blade portion of each of these saw blades has a repeating tooth pattern or group that includes at least one first relatively high unset tooth, a first plurality of set teeth following the first relatively high unset tooth and set to one side of the blade portion, at least one second relatively high unset tooth following the first plurality of set teeth, and a second plurality of set teeth following the at least one second relatively high unset tooth and set to an opposite side of the blade portion relative to the first plurality of set teeth. In some such embodiments, a plurality of at least one of the first and second pluralities of set teeth define different set magnitudes and different heights relative to each other.

Figure 9:
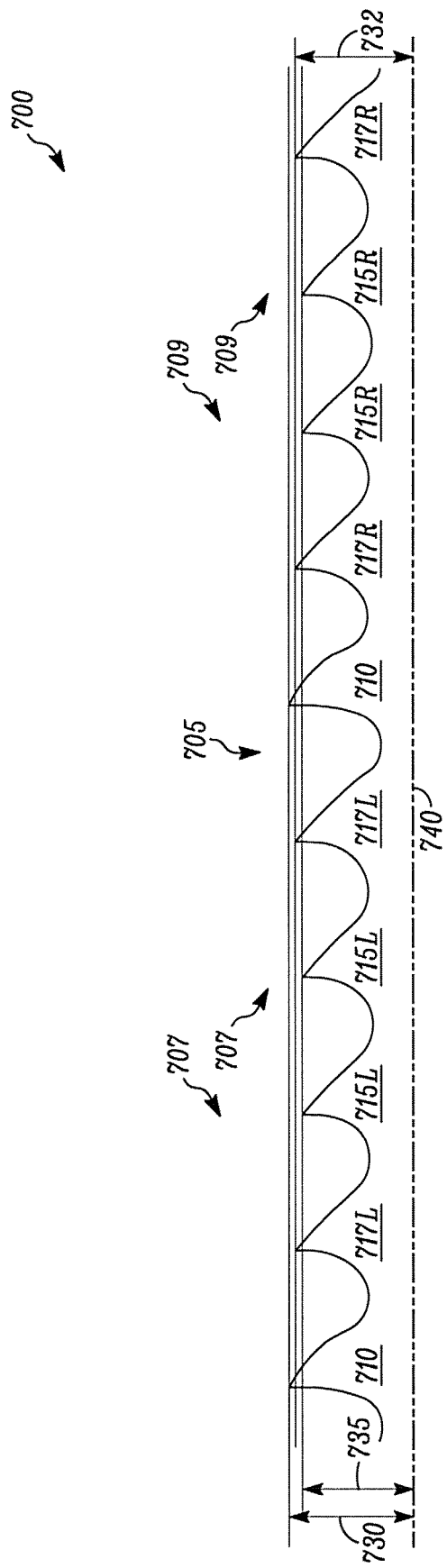
FIG. 9 is a side elevational view of another embodiment of a reciprocating saw blade having a variable tooth height and/or set forming a wavy pattern.

In FIG. 9, the reciprocating saw blade 700 is substantially similar to the reciprocating saw blades described above in connection with FIGS. 1-8, and therefore like reference numerals preceded by the numeral "7" instead of the numerals "1" through "6" are used to indicate like elements. The recip blade 700 includes a ten-tooth pattern 705 that includes a high unset tooth 710 followed by a first plurality 707 of left set teeth, a second high unset tooth 710 following first plurality 707, and a second plurality 709 of right set teeth following the second high unset tooth 710. Alternatively, first plurality 707 may be right set, and second plurality 709 may be left set. At least one of first plurality 707 and second plurality 709 includes at least one intermediate height set tooth 717L and/or 717R that is relatively light set, and at least one low set tooth 715L and/or 715R that is relatively heavy set.

More specifically, first plurality 707 includes two intermediate height light set teeth 717L and two low heavy set teeth 715L, which are all set to the left of the blade portion of blade 700, and second plurality 709 includes intermediate height light set teeth 717R and two low heavy set teeth 715R, which are all set to the right of the blade portion. High unset teeth 710 have a first height 730, low set teeth 715L, 715R have a second height 735, and intermediate height light set teeth 717L, 717R have a third height 732. First height 730 is greater than third height 732, and third height 732 is greater than second height 735. In one embodiment, the difference in height between each intermediate height light set tooth 717L, 717R prior to tooth set and a respective preceding unset tooth 710 is at least about 0.002 inch, and the difference in height between each intermediate height set tooth and low set tooth prior to tooth set is at least about 0.002 inch. As may be recognized by those of ordinary skill in the pertinent art based on the teachings herein, numerous other height differentials equally may be employed. Intermediate height light set teeth 717L, 717R may be set to a first set magnitude, and low set teeth 715R and 715L may be set to a second magnitude greater than the first set magnitude.

The set teeth may be positioned to so that the magnitude of one or more of the height and set of each tooth in the pluralities 707 and 709 forms a wavy height and/or set design. In this embodiment, the magnitude of the tooth heights progressively decreases and the magnitude of the tooth sets progressively increases, and then the magnitude of the tooth heights progressively increases and the magnitude of the tooth sets progressively decreases, along a curve. As a result, the progression of height and/or set magnitude along the elongated axis of the cutting portion of the blade 700 forms a wave-like pattern. For example, as shown in FIG. 9, the five-tooth progression of plurality 707 includes unset high tooth 710, followed successively by a first intermediate height light set tooth 717L, two low heavy set teeth 715L, and a second intermediate light set tooth 717L. Plurality 709 exhibits a similar pattern of unset high tooth 710 and corresponding right set teeth.

In one embodiment, unset high tooth 710 has a clearance angle that is relatively small compared to the clearance angles of the intermediate light set teeth 717L, 717R and the low heavy set teeth 715L, 715R. Intermediate light set teeth 717L, 717R may each have a clearance angle that is substantially the same as the clearance angles of low set teeth 715L, 715R, or the clearance angles of the set teeth may differ from each other. For example, the intermediate height light set teeth may define a more shallow clearance angle than the low heavy set teeth, but steeper clearance angles then the high unset teeth. Alternatively, all of the teeth in pattern 705 may have approximately the same clearance angle. In one example, intermediate light set teeth 717L, 717R and low heavy set teeth 715L, 715R each have a clearance angle of about 40°, and high unset teeth 710 each have a clearance angle of about 30°.

Figure 10:
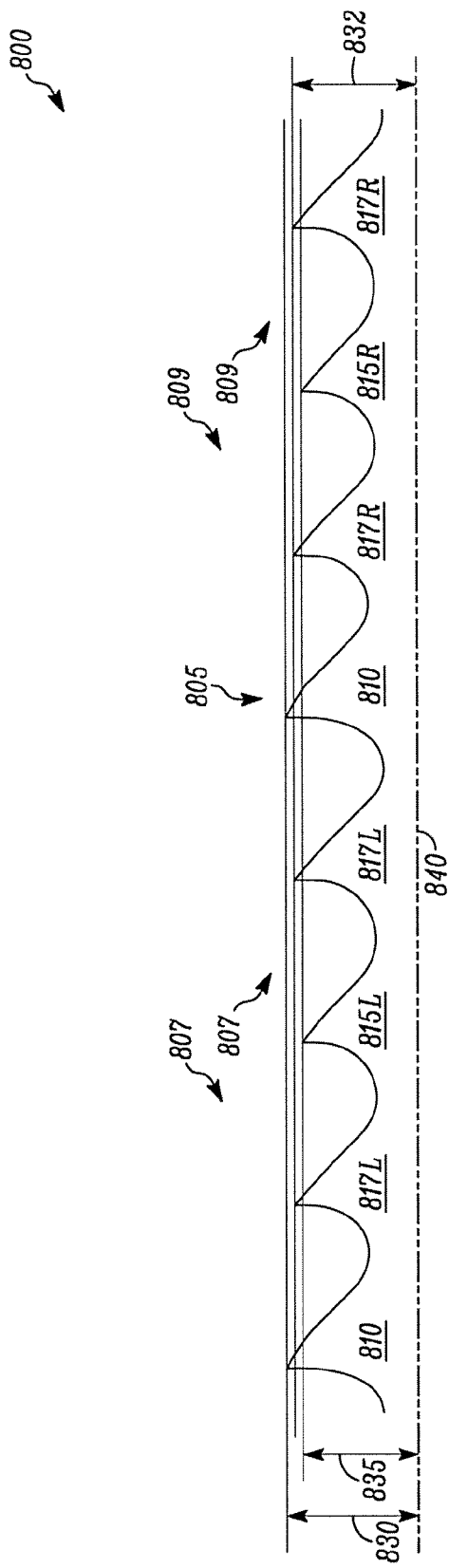
FIG. 10 is a side elevational view of another embodiment of a reciprocating saw blade having another variable tooth height and/or set forming a wavy pattern.

In FIG. 10, another reciprocating saw blade embodying the present invention is indicated generally by the reference numeral 800. The reciprocating saw blade 800 is substantially similar to the reciprocating saw blades described above in connection with FIGS. 1-9, and therefore like reference numerals preceded by the numeral "8" instead of the numerals "1" through "7" are used to indicate like elements.

The recip blade 800 includes an eight-tooth pattern 805 that includes a high unset tooth 810 followed by a first plurality 807 of left set teeth, a second high unset tooth 810 following first plurality 807, and a second plurality 809 of right set teeth following the second high unset tooth 810. Alternatively, first plurality 807 may be right set teeth, and second plurality 809 may be left set teeth. At least one of first plurality 807 and second plurality 809 includes at least one intermediate height tooth 817L and/or 817R that is relatively light set, and at least one low tooth 815L and/or 815R that is relatively heavy set.

More specifically, first plurality 807 includes intermediate light set teeth 817L and low heavy set tooth 815L, which are all set to the left of the blade portion of blade 800, and second plurality 809 includes intermediate light set teeth 817R and low heavy set tooth 815R, which are all set to the right of the blade portion. High unset teeth 810 have a first height 830, low heavy set teeth 815L, 815R have a second height 835, and intermediate light set teeth 817L, 817R have a third height 832. First height 830 is greater than third height 832, and third height 832 is greater than second height 835. In one embodiment, the difference in height between each intermediate height light set tooth 817L, 817R prior to tooth set and a respective preceding unset tooth 810 is at least about 0.002 inch, and the difference in height between each intermediate height light set tooth and low heavy set tooth prior to tooth set is at least about 0.002 inch.

Similar to the tooth pattern 705 of FIG. 9, the set teeth of tooth pattern 805 may be positioned so that one or more of the magnitude of the height and set of each tooth in the pluralities 807 and 809 progresses successively along a curve to form a wave pattern. For example, as shown in FIG. 10, the four-tooth progression of plurality 807 includes unset high tooth 810, followed successively by a first intermediate height light set tooth 817L, low heavy set tooth 815L, and a second intermediate height light set tooth 817L. Plurality 809 exhibits a similar pattern of unset high tooth 810 and corresponding right set teeth.

In one embodiment, unset high tooth 810 has a clearance angle that is relatively small compared to the clearance angles of intermediate height light set teeth 817L, 817R and low heavy set teeth 815L, 815R. Intermediate height teeth 817L, 817R may each have a clearance angle that is substantially the same as the clearance angles of low heavy set teeth 815L and 815R, or the clearance angles of the set teeth may be variable. Alternatively, all of the teeth in tooth pattern 805 may have approximately the same clearance angle. In one example, intermediate height light set teeth 817L, 817R and low heavy set teeth 815L, 815R each have a clearance angle of about 40°, and high unset teeth 810 each have a clearance angle of about 30°.

Figure 11:
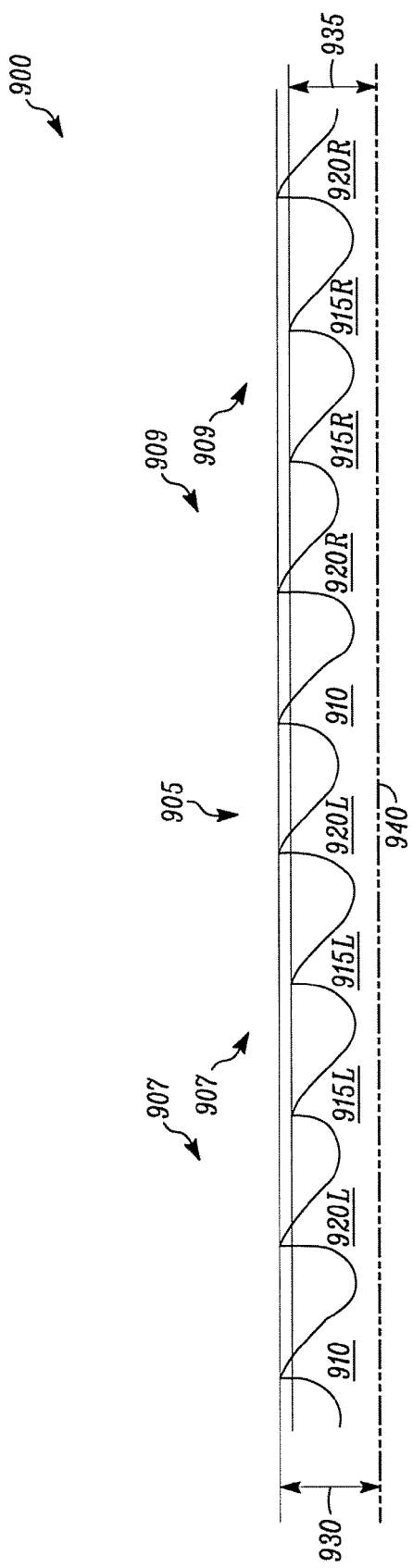
FIG. 11 is a side elevational view of another embodiment of a reciprocating saw blade having another variable tooth height and/or set forming a wavy pattern.

In FIG. 11, another reciprocating saw blade embodying the present invention is indicated generally by the reference numeral 900. The reciprocating saw blade 900 is substantially similar to the reciprocating saw blades described above in connection with FIGS. 1-10, and therefore like reference numerals preceded by the numeral "9" instead of the numerals "1" through "8" are used to indicate like elements.

The reciprocating blade 900 includes a ten-tooth pattern 905 that includes a high unset tooth 910 followed by a first plurality 907 of left set teeth, a second high unset tooth 910 following first plurality 907, and a second plurality 909 of right set teeth following the second high unset tooth 910. At least one of the first plurality 907 and second plurality 909 includes at least one high relatively light set tooth, and at least one low relatively heavy set tooth. The at least one high relatively light set tooth defines a height prior to tooth set that is approximately equal to or less than the height of the preceding unset tooth 910.

More specifically, first plurality 907 includes high light set teeth 920L and low heavy set teeth 915L, which are all set to the left of the blade portion of blade 900, and the second plurality 909 includes high light set teeth 920R and low heavy set teeth 915R, which are all set to the right of the blade portion. The high unset teeth 910 have a first height 930, low heavy set teeth 915L, 915R have a second height 935 that is lower than first height 930, and high light set teeth 920L, 920R have a height that is approximately equal to height 930 prior to tooth set. High light set teeth 920L, 920R may be set to a first set magnitude, and low heavy set teeth 915R, 915L may be set to a second magnitude greater than the first set magnitude.

In one embodiment, high unset tooth 910 has a clearance angle that is relatively small compared to the clearance angles of low heavy set teeth 915L, 915R. High light set teeth 920L, 920R may have a clearance angle that is substantially equal to the clearance angle of high unset tooth 910. The clearance angle of high light set teeth 920L, 920R alternatively may be greater than the clearance angle of high unset tooth 910. High light set teeth 920L, 920R each may have a clearance angle that is substantially the same as the clearance angles of low heavy set teeth 915L, 915R, or the clearance angles of the set teeth may be variable. Alternatively, all of the teeth in tooth pattern 905 may have approximately the same clearance angle. In one example, low heavy set teeth 915L, 915R each have a clearance angle of about 40°, and high unset teeth 910 and high light set teeth 920L, 920R each have a clearance angle of about 30°.

Similar to the embodiments shown in FIGS. 9 and 10, low heavy set teeth 915L, 915R are positioned in between high light set teeth 920L, 920R respectively, so that the magnitude of the height and/or set of the teeth progresses along the blade portion in a wave-like pattern. For example, as shown in FIG. 11, the five-tooth progression of plurality 907 includes high unset tooth 910, followed successively by a first high light set tooth 920L, two low heavy set teeth 915L, and a second high light set tooth 920L. Plurality 909 exhibits a similar pattern of unset high tooth 910 and corresponding right set teeth.

Figure 12:
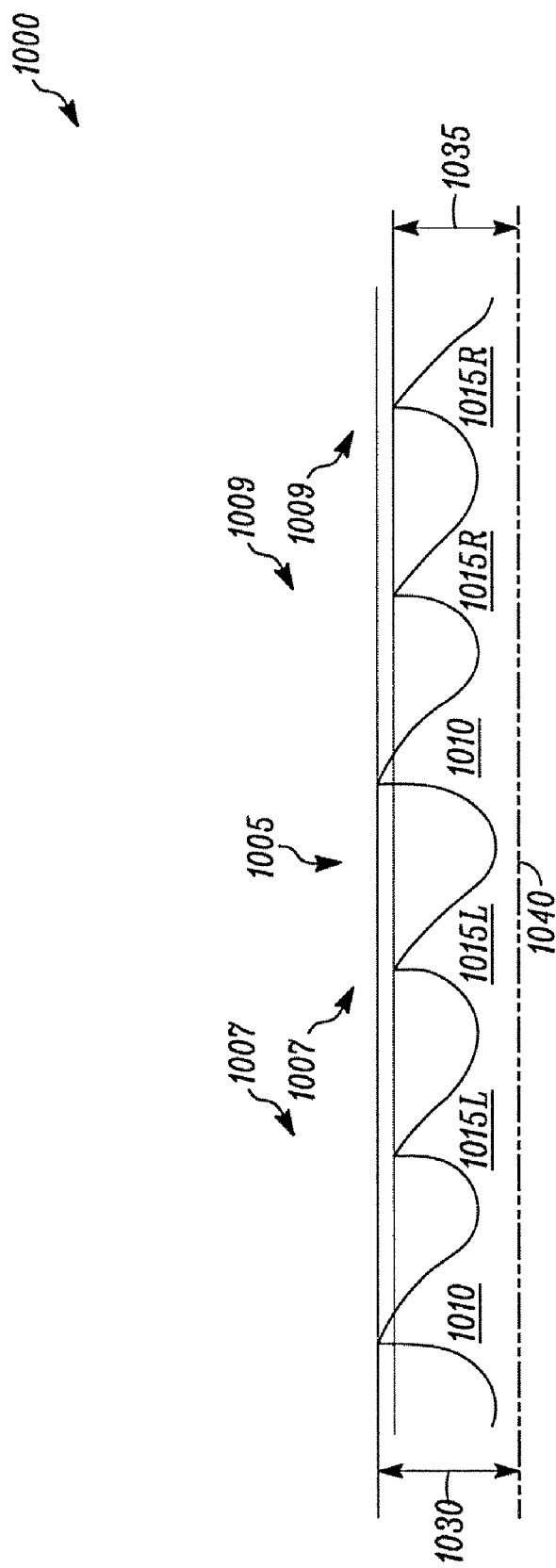
FIG. 12 is a side elevational view of another embodiment of a reciprocating saw blade having unset raker teeth alternately followed by either plural left set or plural right set trailing teeth.

In FIG. 12, a reciprocating saw blade embodying the present invention is indicated generally by the reference numeral 1000. The reciprocating saw blade 1000 is substantially similar to the reciprocating saw blades described above in connection with FIGS. 1-11, and therefore like reference numerals preceded by the numeral "10" instead of the numerals "1" through "9" are used to indicate like elements.

The recip blade 1000 includes a six-tooth pattern 1005 that includes a high unset tooth 1010 followed by a first plurality 1007 of left set teeth, a second high unset tooth 1010 following first plurality 1007, and a second plurality 1009 of right set teeth following the second high unset tooth 1010. At least one of the first plurality 1007 and the second plurality 1009 include at least one low set tooth. The at least one low set tooth defines a height that is approximately equal to or less than the height of the preceding unset tooth 1010. As can be seen, tooth pattern 1005 is similar to tooth pattern 905 shown in FIG. 1, with the exception that tooth pattern 1005 does not include additional set teeth that are higher than the low set teeth.

More specifically, first plurality 1007 includes set teeth 1015L, which are all set to the left of the blade portion of the blade 1000, and second plurality 1009 includes set teeth 1015R, which are all set to the right of the blade portion. High unset teeth 1010 have a first height 1030, and low set teeth 1015L, 1015R have a second height 1035 that is lower than first height 1030. In this embodiment, unset high tooth 1010 has a clearance angle that is relatively small compared to the clearance angles of low set teeth 1015L, 1015R. In one example, low set teeth 1015L, 1015R each have a clearance angle of about 40°, and high unset teeth 1010 each have a clearance angle of about 30°. Alternatively, all of the teeth in tooth pattern 1005 may have approximately the same clearance angle. The three-tooth progression of plurality 1007 includes unset high tooth 1010 followed successively by low heavy set teeth 1015L. Plurality 1009 exhibits a similar pattern of unset high tooth 1010 and corresponding right set teeth. If desired, the set magnitudes may vary to form a more wave-like pattern.

Figure 13:
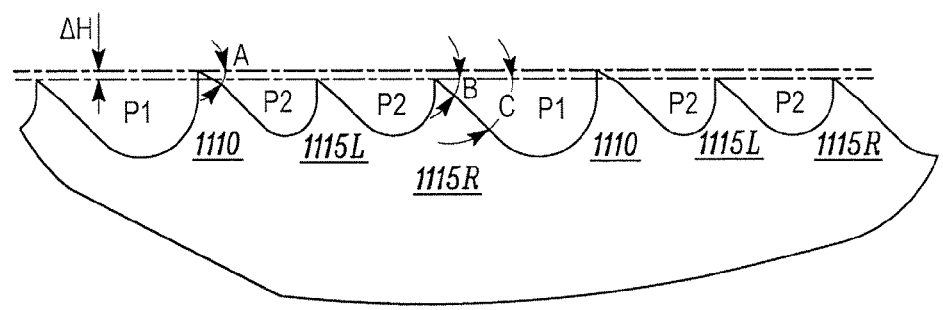
FIG. 13 is a side elevational view of another embodiment of a reciprocating saw blade defining a variable pitch pattern.

Turning to FIG. 13, another reciprocating saw blade embodying the present invention is indicated generally by the reference numeral 1100. The reciprocating saw blade 1100 is substantially similar to the reciprocating saw blades described above in connection with FIGS. 1-12, and therefore like reference numerals preceded by the numeral "11" instead of the numerals "1" through "10" are used to indicate like elements. A primary difference of the recip saw blade 1100 in comparison to the recip saw blades described above is that the recip saw blade 1100 defines a variable pitch pattern. More specifically, the recip saw blade 1100 defines a variable-pitch, three tooth set pattern, including a first relatively high unset tooth 1110, followed by a low left set trailing tooth 1115L and a low right set trailing tooth 1115R. The ΔH between the high and low teeth prior to tooth set is at least about 0.002 inch, and in the illustrated embodiment is about 0.005 inch. The first clearance angle A of the high teeth is less than the second clearance angle B of the low teeth. In the illustrated embodiment, the first clearance angle A of the high teeth is about 30°, and the second clearance angle B of the low teeth is about 40°. As with the tooth forms described above, each tooth 1110, 1115 defines a primary clearance surface forming either the first or second clearance angle A or B, and a secondary clearance surface forming the third clearance angle C. As indicated above, each third clearance angle C is preferably greater than the respective primary clearance angle A or B. In the illustrated embodiment, the first clearance angle A is about 30°, the second clearance angle B is about 40°, and the third clearance angle C is about 45°. As can be seen, the first pitch P1 of each unset tooth 1110 is a relatively coarse pitch, and the second pitch P2 of the trailing teeth 1115L, 1115R is a relatively fine pitch. In the illustrated embodiment, the first pitch P1 is a 10 pitch, the second pitch P2 is a 14 pitch, and thus the recip blade 1100 defines a 10/14 repeating pitch pattern. As may be recognized by those of ordinary skill in the pertinent art based on the teachings herein, these particular height differentials, clearance angles, and pitches are only exemplary, and any of numerous different height differentials, clearance angles, pitches, and/or pitch patterns, and/or any of numerous different variable pitch patterns, that are currently known, or that later become known, equally may be employed. For example, a finer pitch pattern, such as a 14/18 pitch pattern may employ a lesser ΔH than described above in connection with FIG. 13, such as a ΔH of about 0.003 inch.

One of the drawbacks of prior art variable pitch recip blades is that the unset teeth, or the teeth with the largest pitch and/or gullets, define relatively weak points on the blade and tend to prematurely fail. A significant advantage of some currently preferred embodiments of the variable pitch recip blades of the present invention is that the teeth with the largest gullets are the unset raker teeth having a relatively high tooth height and shallow clearance angle, and thus a relatively robust tooth form in comparison to the other teeth of the saw blade. As a result, such embodiments of the variable pitch recip blades of the present invention can provide significantly improved durability and/or blade life in comparison to prior art variable pitch recip blades. However, the high unset raker of the recip blades of the present invention need not define the largest pitch or gullet. Other variable pitch recip blade embodiments of the present invention define variable pitch embodiments having unset raker teeth define smaller, or at least not the largest gullets. For example, another recip blade embodiment of the present invention defines a repeating 3-tooth set pattern and a variable pitch pattern including a high unset leading tooth followed by a low right set trailing tooth and a low left set trailing tooth. In this embodiment, the low left set trailing tooth defines the coarse pitch P1, and the high unset tooth and low right set trailing tooth each define the finer pitch P2. Otherwise, the teeth define the same height differentials and clearance angles as the corresponding teeth of the recip blade 1100 of FIG. 13. These recip blades are also capable of providing significant advantages with respect to cutting speed and durability for the reasons summarized above.

Figure 14:
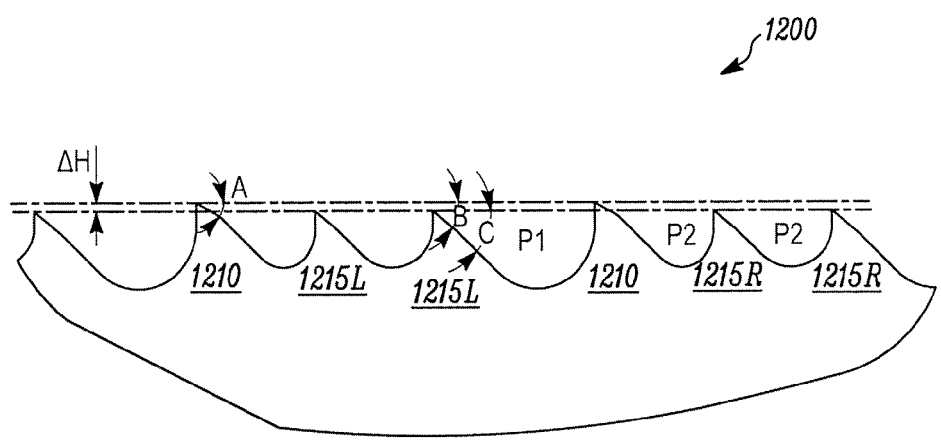
FIG. 14 is a side elevational view of another embodiment of a reciprocating saw blade defining another variable pitch pattern.

Turning to FIG. 14, another reciprocating saw blade embodying the present invention is indicated generally by the reference numeral 1200. The reciprocating saw blade 1200 is substantially similar to the reciprocating saw blades described above in connection with FIG. 13, and therefore like reference numerals preceded by the numeral "12" instead of the numeral "11" are used to indicate like elements. A primary difference of the recip blade 1200 in comparison to the recip blade 1100 described above is that it defines a 6-tooth set pattern with a 3-tooth variable pitch pattern. As can be seen, the 6-tooth set pattern is defined by a first high unset leading tooth 1210 followed by two low left set trailing teeth 1215, and a second high unset leading tooth 1210 followed by two low right set trailing teeth 1215. As can be seen, the recip saw blade 1200 defines a wave-like set pattern. Otherwise, the recip saw blade 1200 defines the same ΔH, clearance angles, and pitches (i.e., a 10/14 repeating pitch pattern) as the recip saw blade 1100 described above in connection with FIG. 13.

Figure 15:
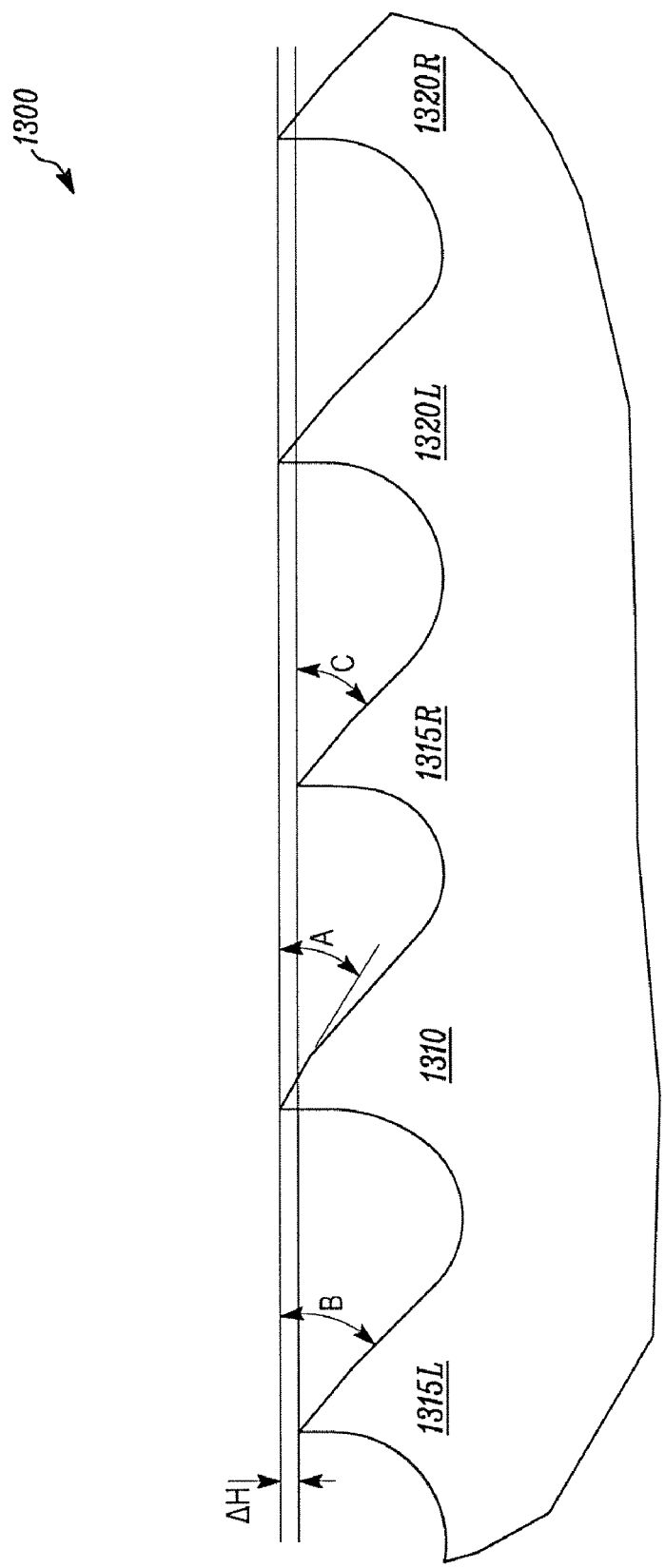
FIG. 15 is a partial, side elevational view of another embodiment of a reciprocating saw blade defining a variable height, clearance and set magnitude.

In FIG. 15, another reciprocating saw blade embodying the present invention is indicated generally by the reference numeral 1300. The reciprocating saw blade 1300 is substantially similar to the reciprocating saw blades described above in connection with FIGS. 1-13, and therefore like reference numerals preceded by the numeral "13", or preceded by the numeral "13" instead of another lead numeral, are used to indicate like elements. A primary difference of the recip blade 1300 in comparison to the recip blades described above, is that the recip blade 1300 defines a variable height, variable clearance and variable set magnitude. More specifically, each repeating tooth pattern of the recip blade 1300 includes a relatively high raker or unset tooth 1310, followed by a relatively low, heavy right set tooth 1315R, a relatively high, light left set tooth 1320L, a relatively high, light right set tooth 1320R, and a relatively low, heavy left set tooth 1315L. In the illustrated embodiment, the height differential ΔH between the relatively high teeth 1310, 1320L, 1320R and the relatively low teeth 1315R and 1315L prior to tooth set is about 0.004 inch, the first primary clearance angle A is about 30°, the second primary clearance angle B is about 40°, and the secondary clearance angle C is about 42° for the relatively high teeth 1310, 1320 and about 45° for the relatively low teeth 1315, and the pitch is about 14 TPI. As may be recognized by those of ordinary skill in the pertinent art based on the teachings herein, this height differential, the clearance angles, the set magnitudes, and the pitch are only exemplary, and numerous other height differentials, clearance angles, set magnitudes, and pitches, including variable pitches, that are currently known, or that later become known, equally may be employed. In addition, any of numerous different teeth may define the heavy sets and any of numerous other teeth may define the light sets. For example, a light set tooth may immediately follow each heavy set tooth and vice versa. It has been determined with respect to some embodiments of the present invention that the variable set magnitudes provide improved performance with respect to cutting speed and/or durability. For example, in some such embodiments the relatively low teeth are heavy set, and the relatively high set teeth are light set, and in some such embodiments, the relatively low teeth define steeper clearance angles and the relatively high teeth define more shallow clearance angles.

As may be recognized by those of ordinary skill in the pertinent art based on the teachings herein, any of these variables may be changed as desired or otherwise required, and/or any of numerous different variable pitch patterns, that are currently known, or that later become known, equally may be employed. For example, another variable pitch recip blade of the present invention defines a 6-tooth set pattern having a repeating 3-tooth variable pitch pattern including a high unset leading tooth followed by two low right set trailing teeth, and another high unset leading tooth following by two low left set trailing teeth. In this embodiment, the set tooth and the first trailing tooth define the finer pitches P2, and each second trailing tooth defines the coarser pitch P1. Otherwise, the teeth define the same height differentials and clearance angles as the corresponding teeth of the recip blade 1200 of FIG. 14. Another variable pitch recip blade of the present invention defines a three-tooth set pattern with a six-tooth variable pitch pattern. In this embodiment, the repeating three-tooth set pattern consists of an unset leading tooth following by opposite set trailing teeth (i.e., a left set trailing tooth followed by a right set trailing tooth, or vice versa); and the six-tooth variable pitch pattern consists of a first three-tooth set pattern wherein each tooth defines a relatively coarse pitch (e.g., a 10 pitch), and a second three-tooth pattern wherein each tooth defines a relatively fine pitch (e.g., a 14 pitch). In one such embodiment, the unset teeth define relatively high teeth with more shallow clearance angles, and the trailing set teeth define relatively low teeth with steeper clearance angles.

As may be recognized by those of ordinary skill in the pertinent art based on the teachings herein, numerous changes and modifications can be made to the above-described and other embodiments of the present invention without departing from the scope of the invention as defined in the appended claims. For example, in some embodiments the teeth are carbide tipped; however, the teeth also may define any of numerous different constructions that are currently known, or that later become known, including bi-metal or other constructions. Further, the saw blades of the present invention may be coated with any of numerous different coatings that are currently known or that later become known, such as a titanium nitride coating (TiN), aluminum titanium nitride (AlTiN), or combinations thereof, or the saw blades may not include any coating at all. Numerous other features of the saw blades disclosed herein may be changed as desired, or otherwise as required to meet the requirements of a particular application. Accordingly, this detailed description of the currently preferred embodiments is to be taken in an illustrative, as opposed to a limiting sense.

What is claimed is:

1. A method comprising the following steps:
mounting within a chuck of a reciprocating saw a reciprocating saw blade including a tang having an elongated axis and a blade portion having a cutting edge defined by a plurality of cutting teeth; wherein the cutting teeth define a repeating pattern of successive groups of teeth, each group of teeth includes a plurality of teeth of different species, including a plurality of set teeth, at least one relatively high tooth, and at least one relatively low tooth; and wherein prior to tooth set the at least one relatively high tooth is at least about 0.002 inch higher than the at least one relatively low tooth, wherein the at least one relatively high tooth defines at least one first clearance angle, and the at least one relatively low tooth defines at least one corresponding second clearance angle that is greater than the first clearance angle, wherein either (i) the at least one first clearance angle defines a primary clearance angle of the at least one relatively high tooth and the at least one second clearance angle defines a primary clearance angle of the at least one relatively low tooth; or (ii) the at least one first clearance angle defines a secondary clearance angle of the at least one relatively high tooth and the at least one second clearance angle defines a secondary clearance angle of the at least one relatively low tooth;
driving the reciprocating saw blade with the reciprocating saw in a reciprocating cutting action between forward and backward strokes; and
cutting a work piece by engaging the work piece with the reciprocatingly driven reciprocating saw blade and, in turn, during each of a plurality of forward strokes, engaging multiple teeth of the same species with the work piece, bearing a relatively higher chip load with the relatively high teeth in comparison to the relatively low teeth, protecting the relatively low teeth from chipping or damage with the preceding relatively high teeth, and cutting the work piece with the relatively low teeth at a higher speed in comparison to the relatively high teeth.

2. A method as defined in claim 1, wherein each group of teeth is less than about a half inch in length, and wherein the step of driving the reciprocating saw blade comprises driving the reciprocating saw blade in a reciprocating motion between a rear most position and a forward most position, wherein the reciprocating motion defines an axis of motion extending between i) a first position of a reference point of the saw blade when the saw blade is in the rear most position, and ii) a second position of the reference point when the saw blade is in the forward most position, and the cutting edge defines an approximate cutting line extending between tips of successive teeth having substantially the same height, and further comprising the step of positioning or orienting the cutting line at an acute angle of greater than about 3° relative to the axis of motion.

3. A method as defined in claim 2, wherein the step of positioning or orienting the cutting line at an acute angle includes at least one of: (i) providing the tang so that the elongated axis of the tang defines an acute angle relative to the cutting line, and (ii) mounting the tang within the chuck so that the cutting line is oriented at an acute angle relative to the axis of motion.

4. A reciprocating saw blade as defined in claim 1, wherein the at least one first clearance angle defines a primary clearance angle of the at least one relatively high tooth and the at least one second clearance angle defines a primary clearance angle of the at least one relatively low tooth.

5. A reciprocating saw blade as defined in claim 1, wherein the at least one first clearance angle defines a secondary clearance angle of the at least one relatively high tooth and the at least one second clearance angle defines a secondary clearance angle of the at least one relatively low tooth.

6. A reciprocating saw blade for use in a portable power reciprocating saw including a chuck for releasably engaging the saw blade, the reciprocating saw blade comprising:
   a reciprocating saw blade tang having an elongated axis and being engageable with the chuck of the reciprocating saw for attaching the reciprocating saw blade to the reciprocating saw; and
   a reciprocating saw blade portion having a cutting edge defined by a plurality of cutting teeth, wherein the cutting teeth define a repeating pattern of successive groups of teeth, each group of teeth includes a plurality of set teeth, at least one relatively high tooth, and at least one relatively low tooth, and wherein prior to tooth set the at least one relatively high tooth is at least about 0.002 inch higher than the at least one relatively low tooth;
   wherein the relatively high teeth define at least one first clearance angle, and the relatively low teeth define at least one corresponding second clearance angle that is greater than the first clearance angle, wherein either (i) the at least one first clearance angle defines a primary clearance angle of the relatively high teeth and the at least one second clearance angle defines a primary clearance angle of the relatively low teeth; or (ii) the at least one first clearance angle defines a secondary clearance angle of the relatively high teeth and the at least one second clearance angle defines a secondary clearance angle of the relatively low teeth.

7. A reciprocating saw blade as defined in claim 6, wherein prior to tooth set the difference in height between the at least one relatively high tooth and the at least one relatively low tooth is within the range of about 0.003 inch to about 0.006 inch.

8. A reciprocating saw blade as defined in claim 6, wherein the first clearance angle is less than or equal to about 35°, and the second clearance angle is greater than about 35°.

9. A reciprocating saw blade as defined in claim 8, wherein the first clearance angle is within the range of about 25° to about 35°, and the second clearance angle is within the range of about 35° to about 45°.

10. A reciprocating saw blade as defined in claim 6, wherein each group of teeth is less than about a half inch in length, and includes at least one unset leading tooth and a plurality of set trailing teeth.

11. A reciprocating saw blade as defined in claim 10, wherein the at least one unset leading tooth is a relatively high tooth, and at least one of the plurality of set trailing teeth is a relatively low tooth.

12. A reciprocating saw blade as defined in claim 11, wherein at least one of the set trailing teeth is a relatively high tooth.

13. A reciprocating saw blade as defined in claim 6, wherein a plurality of the set trailing teeth define different set magnitudes relative to each other.

14. A reciprocating saw blade as defined in claim 13, wherein the plurality of set trailing teeth includes at least one first set tooth defining a relatively heavy set magnitude, and at least one second set tooth defining a relatively light set magnitude.

15. A reciprocating saw blade as defined in claim 14, wherein the at least one first set tooth defining a heavy set magnitude is a relatively low tooth, and the at least one second set tooth defining a relatively light set magnitude is higher than the heavy set tooth.

16. A reciprocating saw blade as defined in claim 15, wherein the at least one relatively low heavy set tooth defines the at least one second clearance angle and the at least one relatively high light set tooth defines the at least one first clearance angle.

17. A reciprocating saw blade as defined in claim 6, wherein each group of teeth includes unset teeth between first and second pluralities of set teeth.

18. A reciprocating saw blade as defined in claim 17, wherein each of the first and second pluralities of set teeth includes at least one relatively high set tooth, and at least one relatively low set tooth.

19. A reciprocating saw blade as defined in claim 18, wherein the unset teeth define the at least one first clearance angle, the set teeth define the at least one second clearance angle.

20. A reciprocating saw blade as defined in claim 6, wherein the reciprocating saw causes the saw blade to move in a reciprocating motion between a rear most position and a forward most position, the reciprocating motion defines an axis of motion extending between i) a first position of a reference point of the saw blade when the saw blade is in the rear most position and ii) a second position of the reference point when the saw blade is in the forward most position, the cutting edge defines an approximate cutting line extending between tips of successive teeth having substantially the same height, and the cutting line is oriented at an acute angle of greater than about 3° relative to the axis of motion.

21. A reciprocating saw blade as defined in claim 20, wherein the acute angle is within the range of about 4½° to about 6°.

22. A reciprocating saw blade as defined in claim 20, wherein the tang defines an elongated axis oriented at an acute tang angle relative to the cutting line which at least contributes to orienting the cutting line at an acute angle of greater than about 3° relative to the axis of motion.

23. A reciprocating saw blade as defined in claim 20, wherein the relatively high teeth define the at least one first clearance angle within the range of about 25° to about 35°, the relatively low teeth define the at least one second clearance angle within the range of about 35° to about 45°, the acute angle is greater than about 3° and less than or equal to about 6°, and the difference in height between the at least one relatively high tooth and the at least one relatively low tooth is at least about 0.003 inch.

24. A reciprocating saw blade as defined in claim 6, wherein each group includes at least one first relatively high unset tooth, a first plurality of set teeth following the first relatively high unset tooth and set to one side of the blade portion, at least one second relatively high unset tooth following the first plurality of set teeth, and a second plurality of set teeth following the at least one second relatively high unset tooth and set to an opposite side of the blade portion relative to the first plurality of set teeth.

25. A reciprocating saw blade as defined in claim 24, wherein a plurality of at least one of the first and second pluralities of set teeth define different set magnitudes and different heights relative to each other.

26. A reciprocating saw blade as defined in claim 25, wherein at least one of the first and second pluralities of set teeth includes at least one intermediate height tooth that is relatively light set, and at least one low tooth that is relatively heavy set, wherein the intermediate height tooth defines a height between the heights of the relatively high and low teeth, and the difference in height between each intermediate height tooth and adjacent high and low teeth prior to tooth set is at least about 0.002 inch.

27. A reciprocating saw blade as defined in claim 6, wherein each group of teeth defines a variable pitch pattern, including at least one relatively coarse pitch and at least one relatively fine pitch.

28. A reciprocating saw blade as defined in claim 27, wherein each group of teeth includes an unset raker tooth defining a relatively coarse pitch.

29. A reciprocating saw blade as defined in claim 6, wherein the at least one first clearance angle defines a primary clearance angle of the relatively high teeth and the at least one second clearance angle defines a primary clearance angle of the relatively low teeth.

30. A reciprocating saw blade as defined in claim 6, wherein each group of teeth includes a plurality of low teeth, and each low tooth includes a rake face defining a positive rake angle.

31. A reciprocating saw blade as defined in claim 6, wherein the at least one first clearance angle defines a secondary clearance angle of the relatively high teeth and the at least one second clearance angle defines a secondary clearance angle of the relatively low teeth.

32. A reciprocating saw blade for use in a portable power reciprocating saw, the reciprocating saw blade comprising:
   first means engageable with the reciprocating saw for attaching the reciprocating saw blade to the reciprocating saw; and
   a reciprocating saw blade cutting edge defined by a plurality of second means for cutting, wherein the second means define a repeating pattern of successive groups thereof, each group includes a plurality of second means laterally set to opposite sides of the cutting edge relative to each other, at least one relatively high second means, and at least one relatively low second means, and wherein prior to being laterally set the at least one relatively high second means is at least about 0.002 inch higher than the at least one relatively low second means;
   wherein the relatively high second means defines at least one first clearance angle, and the relatively low second means defines at least one corresponding second clearance angle that is greater than the first clearance angle, wherein either (i) the at least one first clearance angle defines a primary clearance angle of the relatively high second means and the at least one second clearance angle defines a primary clearance angle of the relatively low second means; or (ii) the at least one first clearance angle defines a secondary clearance angle of the relatively high second means and the at least one second clearance angle defines a secondary clearance angle of the relatively low second means.

33. A reciprocating saw as defined in claim 32, wherein the first means is a tang and each second means is a tooth.

34. A reciprocating saw as defined in claim 33, wherein each group of teeth is less than about a half inch in length, and wherein the reciprocating saw causes the reciprocating saw blade to move in a reciprocating motion between a rear most position and a forward most position, the motion defines an axis of motion extending between i) a first position of a reference point of the saw blade when the saw blade is in the rear most position and ii) a second position of the reference point when the saw blade is in the forward most position, the cutting edge defines an approximate cutting line extending between successive second means having substantially the same height, and the reciprocating saw blade further includes means for orienting the cutting line at an acute angle of greater than about 3° relative to the axis of motion.

35. A reciprocating saw blade as defined in claim 32, wherein the at least one first clearance angle defines a primary clearance angle of the relatively high second means and the at least one second clearance angle defines a primary clearance angle of the relatively low second means.

36. A reciprocating saw blade as defined in claim 32, wherein the at least one first clearance angle defines a secondary clearance angle of the relatively high second means and the at least one second clearance angle defines a secondary clearance angle of the relatively low second means.

* * * * *